US012198703B2

(12) United States Patent
Liu et al.

(10) Patent No.: US 12,198,703 B2
(45) Date of Patent: *Jan. 14, 2025

(54) ENCODING METHOD AND APPARATUS

(71) Applicant: Top Quality Telephony, LLC, Austin, TX (US)

(72) Inventors: Zexin Liu, Beijing (CN); Bin Wang, Beijing (CN); Lei Miao, Beijing (CN)

(73) Assignee: Top Quality Telephony, LLC, Austin, TX (US)

( * ) Notice: Subject to any disclaimer, the term of this patent is extended or adjusted under 35 U.S.C. 154(b) by 390 days.

This patent is subject to a terminal disclaimer.

(21) Appl. No.: 17/672,824

(22) Filed: Feb. 16, 2022

(65) Prior Publication Data

US 2022/0172730 A1 Jun. 2, 2022

Related U.S. Application Data

(63) Continuation of application No. 16/506,295, filed on Jul. 9, 2019, now Pat. No. 11,289,102, which is a (Continued)

(30) Foreign Application Priority Data

Dec. 2, 2013 (CN) ......................... 201310635004.2

(51) Int. Cl.
*G10L 19/002* (2013.01)
*G10L 19/02* (2013.01)
*G10L 19/035* (2013.01)

(52) U.S. Cl.
CPC ........ *G10L 19/002* (2013.01); *G10L 19/0204* (2013.01); *G10L 19/035* (2013.01)

(58) Field of Classification Search
CPC ....... G10L 19/00; G10L 19/002; G10L 19/02; G10L 19/0204; G10L 19/032
See application file for complete search history.

(56) References Cited

U.S. PATENT DOCUMENTS 6,301,555 B2 10/2001 Hindericks
6,308,150 B1 10/2001 Neo et al.
(Continued)

FOREIGN PATENT DOCUMENTS

CN 101206860 A 6/2008
CN 101562015 A 10/2009
(Continued)

OTHER PUBLICATIONS

G.719, Recommendation ITU-T G.719, Low-complexity, full-band audio coding for high-quality, conversational applications , ITU-T, Telecommunication Standardization Sector of ITU, Series G: Transmission Systems and Media, Digital Systems and Networks, Digital terminal equipments Coding of analogue signals, pp. 1-50, Published in Jun. 2008. total 58 pages.
(Continued)

*Primary Examiner* — Paras D Shah
(74) *Attorney, Agent, or Firm* — Conley Rose, P.C.; Grant Rodolph; Nicholas K. Beaulieu

(57) ABSTRACT

An audio signal encoding method and device are provided. The method and device are used to encode an audio signal to obtain a bitstream representing the analog audio signal, in which a proper bit allocation for spectral coefficients can be performed.

20 Claims, 6 Drawing Sheets

Related U.S. Application Data continuation of application No. 15/650,714, filed on Jul. 14, 2017, now Pat. No. 10,347,257, which is a continuation of application No. 15/170,524, filed on Jun. 1, 2016, now Pat. No. 9,754,594, which is a continuation of application No. PCT/CN2014/081813, filed on Jul. 8, 2014.

(56) References Cited

U.S. PATENT DOCUMENTS

| | | | |
|---|---|---|---|
| 6,349,284 | B1 | 2/2002 | Park et al. |
| 7,016,502 | B2 | 3/2006 | Toyama et al. |
| 7,428,489 | B2 | 9/2008 | Touyama et al. |
| 7,698,130 | B2 | 4/2010 | Kim et al. |
| 7,702,514 | B2 | 4/2010 | Lin et al. |
| 7,983,424 | B2 | 7/2011 | Rling et al. |
| 8,170,885 | B2 | 5/2012 | Kim et al. |
| 9,183,847 | B2 | 11/2015 | Choo et al. |
| 2003/0088423 | A1 | 5/2003 | Nishio et al. |
| 2003/0187635 | A1 | 10/2003 | Ramabadran et al. |
| 2005/0237744 | A1 | 10/2005 | Marra et al. |
| 2005/0254588 | A1 | 11/2005 | Kim et al. |
| 2005/0267744 | A1 | 12/2005 | Nettre et al. |
| 2006/0041426 | A1 | 2/2006 | Ojanpera |
| 2006/0206316 | A1* | 9/2006 | Sung ..................... G10L 19/093 704/E19.044 |
| 2007/0219785 | A1 | 9/2007 | Gao |
| 2008/0077413 | A1 | 3/2008 | Eguchi |
| 2009/0240491 | A1 | 9/2009 | Reznik |
| 2009/0319278 | A1 | 12/2009 | Yoon et al. |
| 2010/0106509 | A1 | 4/2010 | Shimada |
| 2010/0274558 | A1 | 10/2010 | Yamanashi et al. |
| 2011/0066440 | A1 | 3/2011 | Kishore |
| 2011/0194598 | A1 | 8/2011 | Miao et al. |
| 2011/0320211 | A1 | 12/2011 | Liu et al. |
| 2012/0016667 | A1 | 1/2012 | Gao |
| 2012/0035935 | A1 | 2/2012 | Park et al. |
| 2012/0065965 | A1 | 3/2012 | Choo et al. |
| 2012/0116781 | A1 | 5/2012 | Matsumura et al. |
| 2012/0185256 | A1 | 7/2012 | Virette et al. |
| 2012/0226505 | A1 | 9/2012 | Lin et al. |
| 2012/0259644 | A1 | 10/2012 | Lin et al. |
| 2012/0278069 | A1 | 11/2012 | Sung et al. |
| 2012/0323582 | A1 | 12/2012 | Peng et al. |
| 2013/0006645 | A1 | 1/2013 | Jiang et al. |
| 2013/0006647 | A1 | 1/2013 | Suzuki et al. |
| 2013/0018660 | A1* | 1/2013 | Qi ......................... G10L 19/002 704/E19.01 |
| 2013/0030796 | A1 | 1/2013 | Liu |
| 2013/0138432 | A1 | 5/2013 | Tsujino et al. |
| 2013/0290003 | A1 | 10/2013 | Choo |
| 2014/0156284 | A1 | 6/2014 | Porov et al. |
| 2014/0200901 | A1 | 7/2014 | Kawashima et al. |
| 2014/0297293 | A1 | 10/2014 | Heuberger et al. |
| 2015/0088529 | A1 | 3/2015 | Moriya et al. |
| 2015/0262585 | A1 | 9/2015 | Matsumura et al. |
| 2015/0302860 | A1 | 10/2015 | Qi et al. |
| 2015/0317991 | A1 | 11/2015 | Liu et al. |
| 2015/0332699 | A1 | 11/2015 | Liu et al. |
| 2017/0004839 | A1 | 1/2017 | Rettelbach et al. |
| 2017/0316784 | A1 | 11/2017 | Liu et al. |
| 2017/0337931 | A1 | 11/2017 | Kawashima et al. |

FOREIGN PATENT DOCUMENTS

| | | | |
|---|---|---|---|
| CN | 101751926 | A | 6/2010 |
| CN | 101770775 | A | 7/2010 |
| CN | 102081926 | A | 6/2011 |
| CN | 102081927 | A | 6/2011 |
| CN | 102208188 | A | 10/2011 |
| CN | 102222505 | A | 10/2011 |
| CN | 102467910 | A | 5/2012 |
| CN | 105679325 | A | 6/2016 |
| EP | 2051245 | A2 | 4/2009 |
| EP | 2613315 | A1 | 7/2013 |
| IN | 103026408 | A | 4/2013 |
| JP | H08167247 | A | 6/1996 |
| JP | H11219197 | A | 8/1999 |
| JP | 2003177797 | A | 6/2003 |
| JP | 2005328542 | A | 11/2005 |
| JP | 2011197106 | A | 10/2011 |
| JP | 2012103395 | A | 5/2012 |
| JP | 2013015598 | A | 1/2013 |
| JP | 2013174899 | A | 9/2013 |
| KR | 20080099081 | A | 11/2008 |
| KR | 20120137313 | A | 12/2012 |
| KR | 101913241 | B1 | 1/2019 |
| RU | 2437172 | C1 | 12/2011 |
| RU | 2464649 | C1 | 10/2012 |
| RU | 2487428 | C2 | 7/2013 |
| RU | 2498421 | C2 | 11/2013 |
| WO | 2009001874 | A1 | 12/2008 |
| WO | 2009081568 | A1 | 7/2009 |
| WO | 2012012414 | A1 | 1/2012 |
| WO | 2013035257 | A1 | 3/2013 |

OTHER PUBLICATIONS

"Minjie Xie, et al. ITU-T G. 719: A new low-complexity full-band (20 kHz) audiocoding standard for high-quality conversational applications. IEEE Workshop onApplications of Signal Processing to Audio Oct. 18-21, 2009. total 4 pages."

XP017543700 Editor G 719: "draft new ITU-T recommendation G.719 low-complexity full-band audio coding for high-quality conversational applications(for consent);TD 523(PLEN/16)", May 15, 2008, total 46 pages.

Office Action dated Aug. 17, 2016; U.S. Appl. No. 15/170,524, filed Jun. 1, 2016; 24 pages.

Final Office Action dated Jan. 5, 2017; U.S. Appl. No. 15/170,524, filed Jun. 1, 2016; 20 pages.

Notice of Allowance dated Apr. 25, 2017; U.S. Appl. No. 15/170,524, filed Jun. 1, 2016; 18 pages.

Office Action dated Sep. 19, 2018; U.S. Appl. No. 15/650,714, filed Jul. 14, 2017; 28 pages.

Notice of Allowance dated Feb. 19, 2019; U.S. Appl. No. 15/650,714, filed Jul. 14, 2017; 14 pages.

Office Action dated Jul. 8, 2021; U.S. Appl. No. 16/506,295, filed Jul. 9, 2019; 36 pages.

Notice of Allowance dated Nov. 17, 2021; U.S. Appl. No. 16/506,295, filed Jul. 9, 2019; 12 pages.

PCT International Search Report; Application No. PCT/CN2014/081813; Oct. 14, 2014; 6 pages.

PCT Written Opinion of the International Searching Authority; Application No. PCT/CN2014/081813; Oct. 14, 2014; 9 pages.

* cited by examiner

ENCODING METHOD AND APPARATUS

CROSS-REFERENCE TO RELATED APPLICATIONS

This application is a continuation of U.S. patent application Ser. No. 16,506/295, filed on Jul. 9, 2019, which is a continuation of U.S. patent application Ser. No. 15,650/714, filed on Jul. 14, 2017, now U.S. Pat. No. 10,347,257. which is a continuation of U.S. patent application Ser. No. 15,170/524, filed on Jun. 1, 2016, now U.S. Pat. No. 9,754,594. which is a continuation of International Application No. PCT/CN2014/081813, filed on Jul. 8, 2014, which claims priority to Chinese Patent Application No. 201310635004.2, filed on Dec. 2, 2013. All of the afore-mentioned patent applications are hereby incorporated by reference in their entireties.

TECHNICAL FIELD

The present disclosure relates to the communications field, and in particular, to an encoding method and apparatus.

BACKGROUND

An audio compressing technology is a core of multimedia application technologies such as digital audio broadcasting, and music dissemination and audio communication on the Internet. Transform coding is a commonly used method in the audio compressing technology. During transform coding, audio data is transformed from a data domain to another data domain, so that a large amount of information in the audio data can be represented by using less data, which helps quantize the audio data to achieve an objective of efficient compression coding.

According to an existing transform coding algorithm, an encoder transforms an audio signal from a time domain to a frequency domain (time-frequency transformation) to obtain spectral coefficients of the audio signal, splits the spectral coefficients into subbands, calculates and quantizes frequency envelopes of the subbands to obtain index values of quantized frequency envelopes of the subbands and values of the quantized frequency envelopes of the subbands, then, separately performs bit allocation for spectral coefficients of the subbands according to the values of the quantized frequency envelopes of the subbands and a quantity of available bits, quantizes the spectral coefficients of the subbands according to the values of the quantized frequency envelopes of the subbands and quantities of bits allocated to the spectral coefficients of the subbands, and finally, writes the index values of the quantized frequency envelopes of the subbands and the quantized spectral coefficients of the subbands into a bitstream and transmits the bitstream to a decoder.

However, when bit allocation is performed for the spectral coefficients of the subbands in the prior art, quantization bit allocation is performed for the spectral coefficients of the subbands according to the values of the quantized frequency envelopes of the subbands, which may cause improper quantization bit allocation for spectral coefficients of some subbands, and cause low quality of a signal obtained by the decoder by means of decoding.

SUMMARY

Embodiments of the present disclosure provide an encoding method and apparatus, which can perform proper quantization bit allocation for spectral coefficients of an audio signal, thereby improving quality of a signal obtained by a decoder by means of decoding.

To achieve the foregoing objective, the following technical solutions are used in the embodiments of the present disclosure:

According to a first aspect, an embodiment of the present disclosure provides an encoding method, including:

- after splitting spectral coefficients of a current data frame into subbands, acquiring quantized frequency envelope values of the subbands;
- modifying quantized frequency envelope values of subbands of a first quantity in the subbands;
- allocating quantization bits to the subbands according to modified quantized frequency envelope values of the subbands of the first quantity;
- quantizing a spectral coefficient of a subband to which a quantization bit is allocated in the subbands; and
- writing the quantized spectral coefficient of the subband to which a quantization bit is allocated into a bitstream.

In a first possible implementation manner of the first aspect, the modifying quantized frequency envelope values of subbands of a first quantity in the subbands includes:

- acquiring modification factors of the subbands of the first quantity; and
- modifying the quantized frequency envelope values of the subbands of the first quantity by using the modification factors of the subbands of the first quantity.

With reference to the first possible implementation manner of the first aspect, in a second possible implementation manner, the acquiring modification factors of the subbands of the first quantity includes:

- acquiring signal types of the subbands of the first quantity; and
- determining the modification factors of the subbands of the first quantity according to the signal types of the subbands of the first quantity.

With reference to the second possible implementation manner of the first aspect, in a third possible implementation manner, the method of determining the modification factors of the subbands of the first quantity according to the signal types of the subbands of the first quantity includes:

- when a signal type of a first subband in the subbands of the first quantity is harmonic, determining that a modification factor of the first subband is greater than 1; or
- when a signal type of a first subband in the subbands of the first quantity is non-harmonic, determining that a modification factor of the first subband is less than or equal to 1.

With reference to the second possible implementation manner or the third possible implementation manner of the first aspect, in a fourth possible implementation manner, before the determining the modification factors of the subbands of the first quantity according to the signal types of the subbands of the first quantity, the method further includes:

- acquiring stored reference information of subbands of a second quantity in a previous data frame of the current data frame, where the second quantity is less than or equal to the first quantity; and
- the determining the modification factors of the subbands of the first quantity according to the signal types of the subbands of the first quantity includes:
- determining the modification factors of the subbands of the first quantity according to the signal types of the subbands of the first quantity and the reference information of the subbands of the second quantity.

With reference to the fourth possible implementation manner of the first aspect, in a fifth possible implementation manner, the method of determining the modification factors of the subbands of the first quantity according to the signal types of the subbands of the first quantity and the reference information of the subbands of the second quantity includes:

determining a first modification factor of the first subband according to the signal type of the first subband in the subbands of the first quantity;

determining a second modification factor of the first subband according to reference information of a second subband, corresponding to the first subband, in the subbands of the second quantity; and using a product of the first modification factor and the second modification factor as the modification factor of the first subband.

With reference to the fifth possible implementation manner of the first aspect, in a sixth possible implementation manner, the reference information of the second subband includes a quantization bit allocation status of the second subband and/or a signal type of the second subband; where:

when the reference information of the second subband includes the quantization bit allocation status of the second subband, the second modification factor is a third modification factor; or when the reference information of the second subband includes the signal type of the second subband, the second modification factor is a fourth modification factor; or when the reference information of the second subband includes the quantization bit allocation status of the second subband and the signal type of the second subband, the second modification factor is a product of the third modification factor and the fourth modification factor.

With reference to the sixth possible implementation manner of the first aspect, in a seventh possible implementation manner, when the quantization bit allocation status of the second subband indicates that no spectral coefficient is encoded, it is determined that the third modification factor is less than 1, or when the quantization bit allocation status of the second subband indicates that a spectral coefficient is encoded, it is determined that the third modification factor is greater than 1; and when the signal type of the second subband is harmonic, it is determined that the fourth modification factor is greater than 1, or when the signal type of the second subband is non-harmonic, it is determined that the fourth modification factor is less than or equal to 1.

With reference to the sixth possible implementation manner or the seventh possible implementation manner of the first aspect, in an eighth possible implementation manner, the second modification factor of the first subband is determined according to a ratio of any two values of a frequency envelope value of the second subband, an average frequency envelope value of the subbands of the second quantity, a bandwidth value of the subbands of the second quantity, a maximum value of frequency envelope values of the subbands of the second quantity, and a frequency envelope variance value of the subbands of the second quantity.

With reference to any one of the fifth possible implementation manner to the seventh possible implementation manner of the first aspect, in a ninth possible implementation manner, the first modification factor of the first subband is determined according to a ratio of any two values of a frequency envelope value of the first subband, an average frequency envelope value of the subbands of the first quantity, a bandwidth value of the subbands of the first quantity, a maximum value of frequency envelope values of the subbands of the first quantity, and a frequency envelope variance value of the subbands of the first quantity.

With reference to the first possible implementation manner of the first aspect, in a tenth possible implementation manner, the acquiring modification factors of the subbands of the first quantity includes:

acquiring stored reference information of subbands of a first quantity in a previous data frame of the current data frame; and determining the modification factors of the subbands of the first quantity in the current data frame according to the reference information of the subbands of the first quantity in the previous data frame.

With reference to the tenth possible implementation manner of the first aspect, in an eleventh possible implementation manner, before the determining the modification factors of the subbands of the first quantity in the current data frame according to the reference information of the subbands of the first quantity in the previous data frame, the method further includes:

acquiring signal types of subbands of a third quantity in the subbands in the current data frame, where the third quantity is less than or equal to the first quantity; and the determining the modification factors of the subbands of the first quantity in the current data frame according to the reference information of the subbands of the first quantity in the previous data frame includes:

determining the modification factors of the subbands of the first quantity in the current data frame according to the reference information of the subbands of the first quantity in the previous data frame and the signal types of the subbands of the third quantity.

With reference to the eleventh possible implementation manner of the first aspect, in a twelfth possible implementation manner, the method of determining the modification factors of the subbands of the first quantity in the current data frame according to the reference information of the subbands of the first quantity in the previous data frame and the signal types of the subbands of the third quantity includes:

determining a second modification factor of a first subband in the subbands of the first quantity in the current data frame according to reference information of a second subband in the subbands of the first quantity in the previous data frame;

determining a first modification factor of the first subband according to a signal type of the first subband; and using a product of the first modification factor and the second modification factor as a modification factor of the first subband.

With reference to the first aspect or any one of the first possible implementation manner to the twelfth possible implementation manner of the first aspect, in a thirteenth possible implementation manner, after the allocating quantization bits to the subbands according to modified quantized frequency envelope values of the subbands of the first quantity, the method further includes:

storing reference information of the subbands of the first quantity.

According to a second aspect, an embodiment of the present disclosure provides an encoding apparatus, including:

an acquiring unit, configured to: after splitting spectral coefficients of a current data frame into subbands, acquire quantized frequency envelope values of the subbands;

a modifying unit, configured to modify quantized frequency envelope values, acquired by the acquiring unit, of subbands of a first quantity in the subbands;

an allocating unit, configured to allocate quantization bits to the subbands according to quantized frequency envelope values, modified by the modifying unit, of the subbands of the first quantity;

a quantizing unit, configured to quantize a spectral coefficient of a subband to which a quantization bit is allocated by the allocating unit in the subbands; and a multiplexing unit, configured to write the spectral coefficient, quantized by the quantizing unit, of the subband to which a quantization bit is allocated into a bitstream.

In a first possible implementation manner of the second aspect, the acquiring unit is further configured to acquire modification factors of the subbands of the first quantity; and the modifying unit is further configured to modify, by using the modification factors of the subbands of the first quantity acquired by the acquiring unit, the quantized frequency envelope values, acquired by the acquiring unit, of the subbands of the first quantity.

With reference to the first possible implementation manner of the second aspect, in a second possible implementation manner, the encoding apparatus further includes a determining unit; where:

the acquiring unit is further configured to acquire signal types of the subbands of the first quantity; and the determining unit is configured to determine the modification factors of the subbands of the first quantity according to the signal types of the subbands of the first quantity acquired by the acquiring unit.

With reference to the second possible implementation manner of the second aspect, in a third possible implementation manner, the determining unit is further configured to: when a signal type, acquired by the acquiring unit, of a first subband in the subbands of the first quantity is harmonic, determine that a modification factor of the first subband is greater than 1; or when a signal type, acquired by the acquiring unit, of a first subband in the subbands of the first quantity is non-harmonic, determine that a modification factor of the first subband is less than or equal to 1.

With reference to the second possible implementation manner or the third possible implementation manner of the second aspect, in a fourth possible implementation manner, the acquiring unit is further configured to: before the determining the modification factors of the subbands of the first quantity according to the signal types of the subbands of the first quantity, acquire stored reference information of subbands of a second quantity in a previous data frame of the current data frame, where the second quantity is less than or equal to the first quantity; and the determining unit is further configured to determine the modification factors of the subbands of the first quantity according to the signal types of the subbands of the first quantity and the reference information of the subbands of the second quantity that are acquired by the acquiring unit.

With reference to the fourth possible implementation manner of the second aspect, in a fifth possible implementation manner, the determining unit is further configured to: determine a first modification factor of the first subband according to the signal type, acquired by the acquiring unit, of the first subband in the subbands of the first quantity; determine a second modification factor of the first subband according to reference information, acquired by the acquiring unit, of a second subband, corresponding to the first subband, in the subbands of the second quantity; and use a product of the first modification factor and the second modification factor as the modification factor of the first subband.

With reference to the fifth possible implementation manner of the second aspect, in a sixth possible implementation manner, the reference information of the second subband acquired by the acquiring unit includes a quantization bit allocation status of the second subband and/or a signal type of the second subband; where:

when the reference information of the second subband includes the quantization bit allocation status of the second subband, the second modification factor determined by the determining unit is a third modification factor; or when the reference information of the second subband includes the signal type of the second subband, the second modification factor is a fourth modification factor; or when the reference information of the second subband includes the quantization bit allocation status of the second subband and the signal type of the second subband, the second modification factor is a product of the third modification factor and the fourth modification factor.

With reference to the sixth possible implementation manner of the second aspect, in a seventh possible implementation manner, the determining unit is further configured to: when the quantization bit allocation status of the second subband indicates that no spectral coefficient is encoded, determine that the third modification factor is less than 1, or when the quantization bit allocation status of the second subband indicates that a spectral coefficient is encoded, determine that the third modification factor is greater than 1; and when the signal type of the second subband acquired by the acquiring unit is harmonic, determine that the fourth modification factor is greater than 1, or when the signal type of the second subband acquired by the acquiring unit is non-harmonic, determine that the fourth modification factor is less than or equal to 1.

With reference to the sixth possible implementation manner or the seventh possible implementation manner of the second aspect, in an eighth possible implementation manner, the second modification factor of the first subband determined by the determining unit is determined according to a ratio of any two values of a frequency envelope value of the second subband, an average frequency envelope value of the subbands of the second quantity, a bandwidth value of the subbands of the second quantity, a maximum value of frequency envelope values of the subbands of the second quantity, and a frequency envelope variance value of the subbands of the second quantity.

With reference to the fifth possible implementation manner to the seventh possible implementation manner of the second aspect, in a ninth possible implementation manner, the first modification factor of the first subband determined by the determining unit is determined according to a ratio of any two values of a frequency envelope value of the first subband, an average frequency envelope value of the subbands of the first quantity, a bandwidth value of the subbands of the first quantity, a maximum value of frequency envelope values of the subbands of the first quantity, and a frequency envelope variance value of the subbands of the first quantity.

With reference to the first possible implementation manner of the second aspect, in a tenth possible implementation manner, the acquiring unit is further configured to acquire reference information, stored in the storing unit, of subbands of a first quantity in a previous data frame of the current data frame; and the determining unit is further configured to determine the modification factors of the subbands of the first quantity in the current data frame according to the reference information, acquired by the acquiring unit, of the subbands of the first quantity in the previous data frame.

With reference to the tenth possible implementation manner of the second aspect, in an eleventh possible implementation manner, the acquiring unit is further configured to: before the determining the modification factors of the subbands of the first quantity in the current data frame according to the reference information of the subbands of the first quantity in the previous data frame, acquire signal types of subbands of a third quantity in the subbands in the current data frame, where the third quantity is less than or equal to the first quantity; and the determining unit is further configured to: determine the modification factors of the subbands of the first quantity in the current data frame according to the reference information of the subbands of the first quantity in the previous data frame and the signal types of the subbands of the third quantity that are acquired by the acquiring unit.

With reference to the eleventh possible implementation manner of the second aspect, in a twelfth possible implementation manner, the determining unit is further configured to: determine a second modification factor of a first subband in the subbands of the first quantity in the current data frame according to reference information, acquired by the acquiring unit, of a second subband in the subbands of the first quantity in the previous data frame; determine a first modification factor of the first subband according to a signal type of the first subband acquired by the acquiring unit; and use a product of the first modification factor and the second modification factor as a modification factor of the first subband.

With reference to the second aspect or any one of the first possible implementation manner to the twelfth possible implementation manner of the second aspect, in a thirteenth possible implementation manner, the storing unit is further configured to store reference information of the subbands of the first quantity after the quantization bits are allocated to the subbands according to the modified quantized frequency envelope values of the subbands of the first quantity.

According to the encoding method and apparatus provided in the embodiments of the present disclosure, after splitting spectral coefficients of a current data frame into subbands, an encoder acquires quantized frequency envelope values of the subbands; the encoder modifies quantized frequency envelope values of subbands of a first quantity in the subbands; the encoder allocates quantization bits to the subbands according to modified quantized frequency envelope values of the subbands of the first quantity; the encoder quantizes a spectral coefficient of a subband to which a quantization bit is allocated in the subbands; and finally, the encoder writes the quantized spectral coefficient of the subband to which a quantization bit is allocated into a bitstream. According to this solution, before quantization bit allocation is performed for spectral coefficients of subbands in a current data frame of an audio signal, quantized frequency envelope values of the subbands in the current data frame can be modified according to a signal type of the current data frame and information about a previous data frame; therefore, performing quantization bit allocation for the spectral coefficients of the subbands according to modified quantized frequency envelope values of the subbands and a quantity of available bits can achieve an objective of proper quantization bit allocation for spectral coefficients of an audio signal, thereby improving quality of a signal obtained by a decoder by means of decoding.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
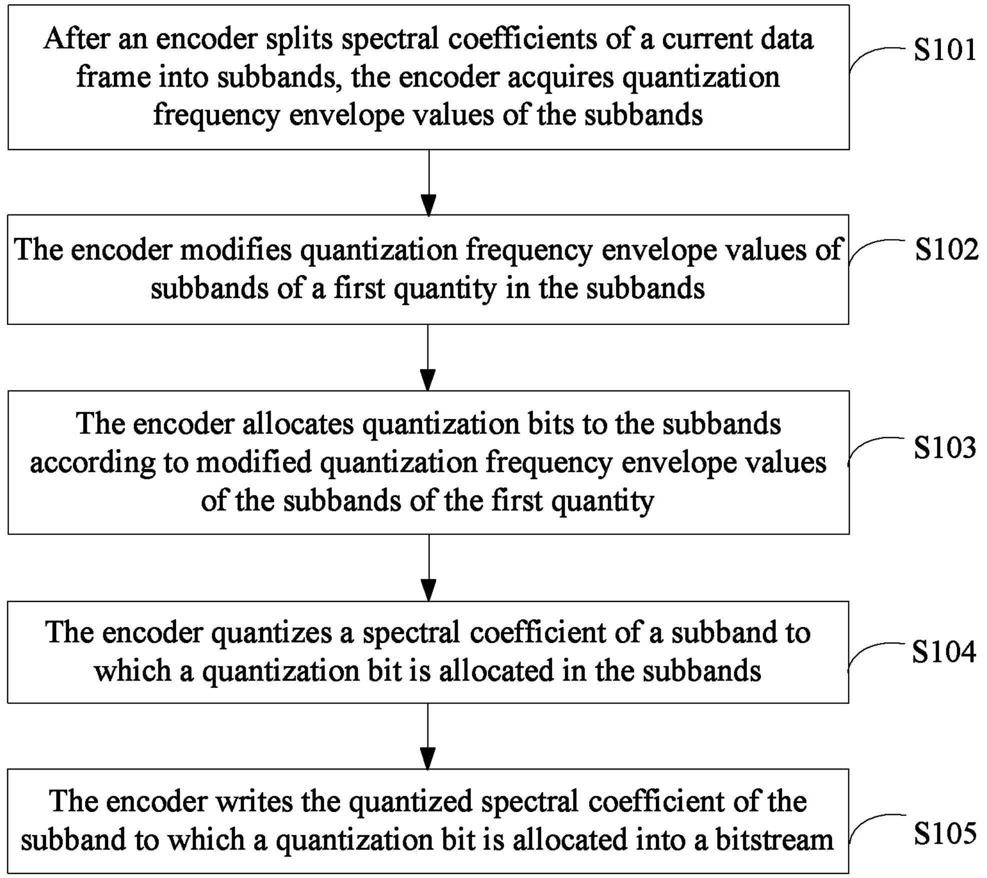
FIG. 1 is a first flowchart of an encoding method according to an embodiment of the present disclosure.

This embodiment of the present disclosure provides an encoding method. As shown in FIG. 1, the method may include the following steps:

S101. After an encoder splits spectral coefficients of a current data frame into subbands, the encoder acquires quantized frequency envelope values of the subbands.

An encoder (encoder) is a device that encodes data or a signal (for example, a bitstream) to convert the data or the signal into a signal that may be used for communication, transmission, and storing. The encoder has different classifications in different technical fields. In the field of communications technologies, the encoder may include a video encoder, an audio encoder, and the like.

The encoder provided in this embodiment of the present disclosure may be an audio encoder. An audio encoder is a tool that may compress an analog audio signal into a data encoding file, that is, an audio compression coding tool. Audio compression coding may be classified into voice signal compression coding and wideband audio signal compression coding. Voice signal compression coding is mainly used in digital phone communication. Wideband audio signal compression coding is mainly applied to sound in digital audio broadcasting, a VCD (Video Compact Disc), a digital versatile disc (DVD), and a high definition television (HDTV).

It should be noted that an audio signal may be transmitted to an encoder frame by frame in a data frame form. A data frame is a protocol data unit at a data link layer, and a data frame may include a frame header, a data part, and a frame trailer. The frame header and the frame trailer include necessary control information such as synchronization information, address information, and error control information. The data part includes data transmitted from a network layer, for example, an IP (Internet Protocol) packet.

The encoder first splits the spectral coefficients of the current data frame into the subbands, and then acquires the quantized frequency envelope values of the subbands.

Exemplarily, in the encoding method provided in this embodiment of the present disclosure, it is assumed that the current data frame is the $y^{th}$ data frame, and after the encoder splits the spectral coefficients of the current data frame, that is, the $y^{th}$ data frame, into N subbands, the encoder separately acquires quantized frequency envelope values of the N subbands, where N≥1, and y≥1. The encoder obtains frequency envelope values of the N subbands in the $y^{th}$ data frame by calculating frequency envelopes of the N subbands in the $y^{th}$ data frame; then the encoder quantizes the frequency envelope values to obtain index values of the quantized frequency envelopes of the N subbands in the $y^{th}$ data frame, and re-creates frequency envelopes of the N subbands in the $y^{th}$ data frame according to the index values of the quantized frequency envelopes, so as to obtain the quantized frequency envelope values of the N subbands in the $y^{th}$ data frame.

Quantization may include scalar quantization and vector quantization. Vector quantization is an efficient data compression technology that has advantages such as a large compression ratio, easy decoding, and a small distortion. The vector quantization technology is widely used in image compression and voice encoding.

Optionally, vector quantization may include pyramid lattice vector quantization, spherical lattice vector quantization, and the like.

S102. The encoder modifies quantized frequency envelope values of subbands of a first quantity in the subbands.

After the encoder acquires the quantized frequency envelope values of the subbands, the encoder modifies the quantized frequency envelope values of the subbands of the first quantity, where the subbands of the first quantity may be some subbands in the subbands.

In the encoding method provided in this embodiment of the present disclosure, the encoder divides each data frame of a transmitted audio signal into subbands of a same quantity, that is, the current data frame and a previous data frame include subbands of a same quantity.

After the encoder obtains the quantized frequency envelope values of the subbands in the current data frame, the encoder may modify the quantized frequency envelope values of the subbands of the first quantity in the current data frame according to signal types of subbands in the current data frame and reference information of subbands in the previous data frame, or signal types of subbands in the current data frame, or reference information of subbands in the previous data frame. In this embodiment of the present disclosure, the current data frame is adjacent to the previous data frame.

For example, assuming that a quantity of subbands in each frame is N, the encoder may modify the quantized frequency envelope values of the subbands of the first quantity in the current data frame according to signal types of M subbands in the current data frame and/or reference information of L subbands in the previous data frame. A value of the first quantity is a larger value between M and L, where 1≤M≤N, and 1≤L≤N. In this embodiment of the present disclosure, the signal types of the M subbands in the current data frame include a signal type of each subband in the M subbands, and the reference information of the L subbands in the previous data frame includes reference information of each subband in the L subbands.

A specific data frame dividing method and a specific modification manner are described in detail in a subsequent embodiment.

Optionally, a signal type of a subband may be harmonic or non-harmonic.

It may be understood that because the encoder modifies the quantized frequency envelope values of the subbands of the first quantity in the current data frame according to the signal types of the subbands in the current data frame and/or the reference information of the subbands in the previous data frame, modified quantized frequency envelope values of the subbands in the current data frame better meet a characteristic of an audio signal, and spectral coefficients of the previous data frame are more continuous with the spectral coefficients of the current data frame.

S103. The encoder allocates quantization bits to the subbands according to modified quantized frequency envelope values of the subbands of the first quantity.

After the encoder modifies the quantized frequency envelope values of the subbands of the first quantity in the subbands, the encoder may perform quantization bit allocation for the subbands in the current data frame according to the modified quantized frequency envelope values of the subbands of the first quantity.

After the encoder modifies the quantized frequency envelope values of the subbands of the first quantity in the current data frame, the encoder may calculate initial values of importance of the subbands in the current data frame (importance of a subband may be measured by using a parameter such as energy or a frequency of the subband) according to the modified quantized frequency envelope values of the subbands of the first quantity in the current data frame, and then allocate available bits to the subbands according to the initial values of importance of the subbands, where more bits are allocated to a subband of high importance, and fewer bits are allocated to a subband of low importance.

It should be noted that a quantity of available bits refers to a total quantity of bits that are available in the current data frame. The quantity of available bits is determined according to a bit rate of the encoder. A larger bit rate of the encoder indicates a larger quantity of available bits.

It may be understood that after the quantized frequency envelope values of the subbands in the current data frame are modified, on one hand, because the modified quantized frequency envelope values, used for quantization bit allocation, of the subbands in the current data frame better meet the characteristic of the audio signal, quantization bit allocation for the spectral coefficients of the subbands is more proper; on the other hand, because the modified quantized frequency envelope values of the subbands in the current data frame may make the spectral coefficients of the previous data frame more continuous with the spectral coefficients of the current data frame, some discrete points on a spectrum during decoding by a decoder are reduced, so that the decoder can better complete decoding.

S104. The encoder quantizes a spectral coefficient of a subband to which a quantization bit is allocated in the subbands.

After the encoder performs quantization bit allocation for the spectral coefficients of the subbands in the current data frame, the encoder quantizes the spectral coefficient of the subband to which a quantization bit is allocated in the subbands in the current data frame.

After the encoder performs quantization bit allocation for the spectral coefficients of the subbands in the current data frame, the encoder may perform normalization processing on the spectral coefficients of the subbands in the current data frame according to the modified quantized frequency envelope values of the subbands in the current data frame, and then quantize the spectral coefficients of the subbands in the current data frame according to quantities of bits separately allocated by the encoder to spectral coefficients of subbands to which quantization bits are allocated in the subbands in the current data frame.

Exemplarily, it is assumed that the current data frame is the $y^{th}$ data frame, the previous data frame is the $(y-1)^{th}$ data frame, and the encoder divides each data frame into N subbands. When quantizing, according to a quantity of bits allocated to the spectral coefficient of the subband to which a quantization bit is allocated in the N subbands in the $y^{th}$ data frame, the spectral coefficient of the subband to which a quantization bit is allocated in the N subbands in the $y^{th}$ data frame, the encoder may use a pyramid lattice vector quantization method to quantize a spectral coefficient of a subband to which fewer bits are allocated, so as to obtain the quantized spectral coefficient of the subband to which fewer bits are allocated; correspondingly, the encoder may use a spherical lattice vector quantization method to quantize a spectral coefficient of a subband to which more bits are allocated, so as to obtain the quantized spectral coefficient of the subband to which more bits are allocated.

It should be noted that there may be a subband to which no quantization bit is allocated in the subbands in the current data frame. In this embodiment of the present disclosure, the encoder quantizes a spectral coefficient of a subband to which a quantization bit is allocated in the subbands in the current data frame. If a quantization bit is allocated to a subband, the quantization bit allocated to the subband is used to quantize a spectral coefficient of the subband. For example, two quantization bits are allocated to a subband, the two quantization bits are used to quantize a spectral coefficient of the subband; three bits are allocated to another subband, the three quantization bits are used to quantize a spectral coefficient of the another subband; if no quantization bit is allocated to a subband, a spectral coefficient of the subband to which no quantization bit is allocated is not quantized.

S105. The encoder writes the quantized spectral coefficient of the subband to which a quantization bit is allocated into a bitstream.

After the encoder quantizes the spectral coefficient of the subband to which a quantization bit is allocated in the current data frame, the encoder needs to write the quantized spectral coefficient of the subband to which a quantization bit is allocated into the bitstream, so that the decoder uses the bitstream to perform decoding.

After the encoder quantizes the spectral coefficient of the subband to which a quantization bit is allocated in the current data frame, the encoder writes the quantized spectral coefficient of the subband to which a quantization bit is allocated, the signal types of the subbands in the current data frame, the reference information of the subbands in the previous data frame, and quantization frequency envelope index values of the subbands in the current data frame into the bitstream, and transmits the bitstream to the decoder for decoding.

It should be noted that for each data frame of an audio signal, the encoder performs encoding according to the foregoing steps S101 to S105, that is, the encoder repeatedly executes S101 to S105 until all data frames of the audio signal are encoded.

It may be understood that after the encoder calculates, quantizes, and modifies each data frame of a to-be-encoded audio signal, the encoder needs to write corresponding parameters such as the signal types of the subbands in the current data frame, the reference information of the subbands in the previous data frame, and the quantization frequency envelope index values of the subbands in the current data frame that are obtained in the foregoing process and the quantized spectral coefficient of the subband to which a quantization bit is allocated in the current data frame into the bitstream, and transmit the bitstream to the decoder, so that the decoder can perform processing such as dequantization and denormalization on the bitstream of an encoded audio signal according to the corresponding parameters obtained during encoding, and then the encoder obtains, after completing decoding, the audio signal before being encoded.

According to the encoding method provided in this embodiment of the present disclosure, after splitting spectral coefficients of a current data frame into subbands, an encoder acquires quantized frequency envelope values of the subbands; the encoder modifies quantized frequency envelope values of subbands of a first quantity in the subbands; the encoder allocates quantization bits to the subbands according to modified quantized frequency envelope values of the subbands of the first quantity; the encoder quantizes a spectral coefficient of a subband to which a quantization bit is allocated in the subbands; and finally, the encoder writes the quantized spectral coefficient of the subband to which a quantization bit is allocated into a bitstream. According to this solution, before quantization bit allocation is performed for spectral coefficients of subbands in a current data frame of an audio signal, quantized frequency envelope values of the subbands can be modified according to a signal type of the current data frame and information about a previous data frame; therefore, performing quantization bit allocation for the spectral coefficients of the subbands according to modified quantized frequency envelope values of the subbands and a quantity of available bits can achieve an objective of proper quantization bit allocation for spectral coefficients of an audio signal, thereby improving quality of a signal obtained by a decoder by means of decoding.

Embodiment 2

Figure 2:
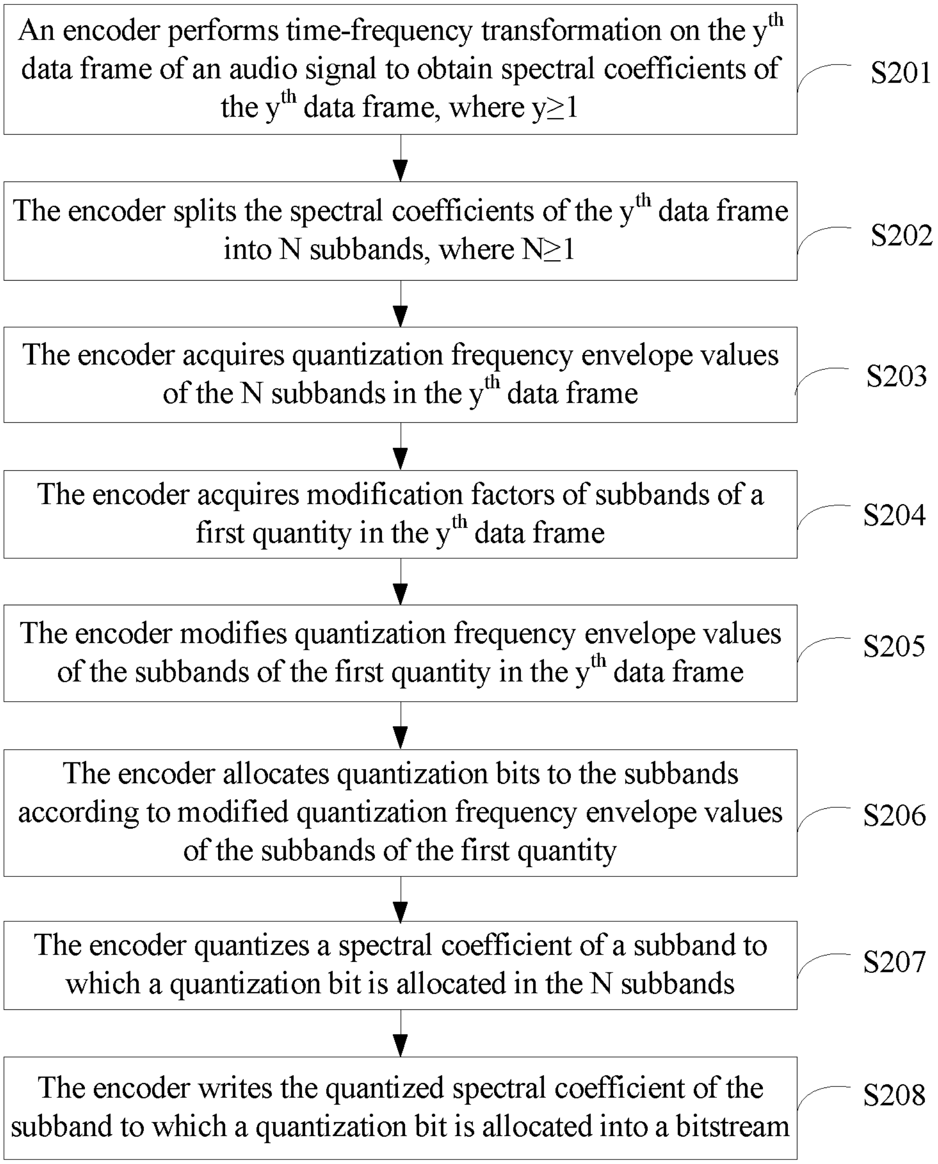
FIG. 2 is a second flowchart of an encoding method according to an embodiment of the present disclosure.

This embodiment of the present disclosure provides an encoding method. In the encoding method provided in this embodiment of the present disclosure, that a current data frame is the $y^{th}$ data frame and a previous data frame is the $(y-1)^{th}$ data frame is used as an example for description, where $y \geq 1$. As shown in FIG. 2, the method may include the following steps:

S201. An encoder performs time-frequency transformation on the $y^{th}$ data frame of an audio signal to obtain spectral coefficients of the $y^{th}$ data frame, where An encoder is a device that encodes data or a signal (for example, a bitstream) to convert the data or the signal into a signal that may be used for communication, transmission, and storing. The encoder has different classifications in different technical fields. In the field of communications technologies, the encoder may include a video encoder, an audio encoder, and the like.

The encoder provided in this embodiment of the present disclosure may be an audio encoder. An audio encoder is a tool that may compress an analog audio signal into a data encoding file, that is, an audio compression coding tool. Audio compression coding may be classified into voice signal compression coding and wideband audio signal compression coding. Voice signal compression coding is mainly used in digital phone communication. Wideband audio signal compression coding is mainly applied to sound in digital audio broadcasting, a VCD, a DVD, and an HDTV.

Time-frequency transformation refers to transforming a signal from a time domain to a frequency domain. Currently, commonly used time-frequency transformation methods include discrete Fourier transform (DFT), discrete cosine transform (DCT), modified discrete cosine transform (MDCT), and the like.

It should be noted that an audio signal may be transmitted to an encoder frame by frame in a data frame form. A data frame is a protocol data unit at a data link layer, and a data frame may include a frame header, a data part, and a frame trailer. The frame header and the frame trailer include necessary control information such as synchronization information, address information, and error control information. The data part includes data transmitted from a network layer, for example, an IP packet.

The encoder transforms the $y^{th}$ data frame of the audio signal from a time domain to a frequency domain by using a time-frequency transformation method, so as to obtain the spectral coefficients of the $y^{th}$ data frame. It may be understood that in an encoding process, the encoder successively transforms each data frame of the audio signal from the time domain to the frequency domain.

S202. The encoder splits the spectral coefficients of the $y^{th}$ data frame into N subbands, where $N \geq 1$.

A subband refers to a frequency band that has a specific characteristic.

In the encoding method provided in this embodiment of the present disclosure, after the encoder performs time-frequency transformation on the audio signal, the encoder divides each data frame of the audio signal obtained after time-frequency transformation into N subbands, that is, the encoder divides any transmitted data frame into N subbands. Therefore, the $y^{th}$ data frame and the $(y-1)^{th}$ data frame have the same quantity of subbands, which is N.

Subbands in the $y^{th}$ data frame are different frequency bands in the $y^{th}$ data frame. Exemplarily, if the spectral coefficients of the $y^{th}$ data frame are from 0 to 8000 Hz, a frequency band from 0 to 20 Hz is one subband in the $y^{th}$ data frame.

Optionally, during subband dividing, the spectral coefficients of the transformed $y^{th}$ data frame may be split into subbands with equal intervals, or the spectral coefficients of the transformed $y^{th}$ data frame may be split into subbands with unequal intervals according to auditory sensing characteristics. Splitting may be performed according to an actual splitting requirement, which is not limited in the present disclosure.

S203. The encoder acquires quantized frequency envelope values of the N subbands in the $y^{th}$ data frame.

Quantization may include scalar quantization and vector quantization.

Vector quantization is an efficient data compression technology that has advantages such as a large compression ratio, easy decoding, and a small distortion. The vector quantization technology is widely used in image compression and voice encoding.

The encoder obtains frequency envelope values of the N subbands in the $y^{th}$ data frame by calculating frequency envelopes of the N subbands in the $y^{th}$ data frame; then the encoder quantizes the frequency envelope values to obtain index values of quantized frequency envelopes of the N subbands in the $y^{th}$ data frame, and re-creates frequency envelopes of the N subbands in the $y^{th}$ data frame according to the index values of the quantized frequency envelopes, so as to obtain the quantized frequency envelope values of the N subbands in the $y^{th}$ data frame.

Optionally, vector quantization may include pyramid lattice vector quantization, spherical lattice vector quantization, and the like.

S204. The encoder acquires modification factors of subbands of a first quantity in the $y^{th}$ data frame.

In this embodiment of the present disclosure, preferably, when modifying the quantized frequency envelope values of the N subbands in the $y^{th}$ data frame, the encoder needs to modify, according to importance of the subbands in the $y^{th}$ data frame, only several subbands that have high importance in the $y^{th}$ data frame, that is, several subbands that have higher energy in the $y^{th}$ data frame, that is, several subbands that have higher frequencies in the $y^{th}$ data frame. Considering continuity between adjacent data frames, a specific value of the first quantity of subbands to be modified in the $y^{th}$ data frame is determined according to a quantity M of subbands that have higher frequencies and are selected from the $y^{th}$ data frame and a quantity L of subbands that have higher frequencies and are selected from the $(y-1)^{th}$ data frame, that is, the value of the first quantity is a larger value between M and L, where $1 \leq M \leq N$, and $1 \leq L \leq N$.

Particularly, a method for selecting the M subbands that have higher frequencies in the $y^{th}$ data frame or the L subbands that have higher frequencies in the $(y-1)^{th}$ data frame is: the encoder may select a reference frequency, and when a start frequency of a subband is higher than the reference frequency, the subband is a subband that has a higher frequency. The reference frequency may be 5 kHz, 5.45 kHz, 5.8 kHz, 6 kHz, 6.2 kHz, 7 kHz, 8 kHz, or 10 kHz, that is, selection of a subband that has a higher frequency may be set according to different conditions, which is not limited in the present disclosure.

Further, in this embodiment of the present disclosure, selection of the reference frequency may be determined according to a highest frequency of a subband in the current data frame and a preset frequency range. That is, a reference frequency=the highest frequency—a frequency range. For example, if the preset frequency range is 2 kHz, and the highest frequency of the subband in the current data frame is 7.45 kHz, the reference frequency=7.45 kHz-2 kHz=5.45 kHz; if the preset frequency range is 3 kHz, and the highest frequency of the subband in the current data frame is 9.2 kHz, the reference frequency=9.2 kHz-3 kHz=6.2 kHz. It may be understood that the preset frequency range may be set according to a requirement or experience.

Figure 3:
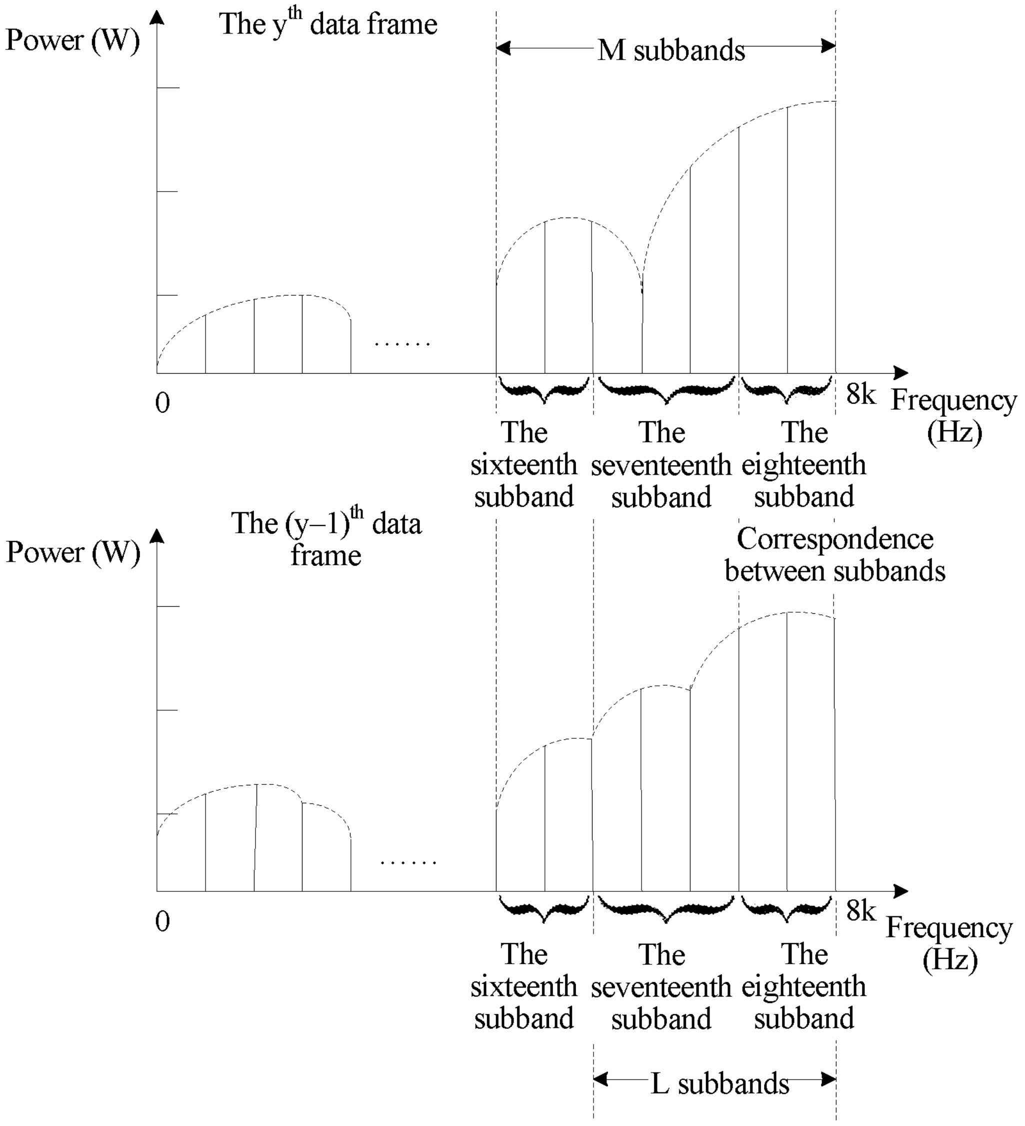
FIG. 3 is a spectral diagram of an audio signal in an encoding method according to an embodiment of the present disclosure.

Further, the encoder may modify the M or L subbands in the $y^{th}$ data frame. As shown in FIG. 3, the M subbands in the $y^{th}$ data frame are M consecutive subbands starting from a subband that has a highest frequency in the N subbands in the $y^{th}$ data frame, and the L subbands in the $(y-1)^{th}$ data frame are L consecutive subbands starting from a subband that has a highest frequency in the N subbands in the $(y-1)^{th}$ data frame.

A case in which MA, is used for description in the following.

If M≥L, the first quantity is M; if a quantity of the L subbands in the $(y-1)^{th}$ data frame is referred to as a second quantity, and the second quantity is less than or equal to the first quantity, subbands of a second quantity in the $(y-1)^{th}$ data frame are the L subbands in the $(y-1)^{th}$ data frame. A method for acquiring, by the encoder, the modification factors of the subbands of the first quantity in the $y^{th}$ data frame includes: determining, by the encoder, the modification factors of the subbands of the first quantity in the $y^{th}$ data frame according to signal types of the subbands of the first quantity in the $y^{th}$ data frame; or determining, by the encoder, the modification factors of the subbands of the first quantity in the $y^{th}$ data frame according to signal types of the subbands of the first quantity in the $y^{th}$ data frame and reference information of the subbands of the second quantity in the $(y-1)^{th}$ data frame.

The encoder selects a corresponding calculation formula according to a signal type of each subband in the M subbands in the $y^{th}$ data frame to determine a value of a modification factor corresponding to each subband in the M subbands; or the encoder selects a corresponding calculation formula according to a signal type of each subband in the M subbands in the $y^{th}$ data frame and reference information of the L subbands in the $(y-1)^{th}$ data frame to determine a modification factor corresponding to each subband in the M subbands in the $y^{th}$ data frame.

It should be noted that the signal types of the M subbands in the $y^{th}$ data frame include a signal type of each subband in the M subbands, and each subband in the M subbands is corresponding to a modification factor.

Further, a method for acquiring, by the encoder, the modification factors of the M subbands in the $y^{th}$ data frame is as follows:

(1) The encoder selects the corresponding calculation formula according to the signal type of each subband in the M subbands in the $y^{th}$ data frame to determine the value of the modification factor corresponding to each subband in the M subbands in the $y^{th}$ data frame.

Optionally, a signal type of a subband may be harmonic or non-harmonic. When a signal type of a first subband in the subbands of the first quantity in the $y^{th}$ data frame is harmonic, the encoder determines that a modification factor of the first subband is greater than 1; when a signal type of a first subband in the subbands of the first quantity in the $y^{th}$ data frame is non-harmonic, the encoder determines that a modification factor of the first subband is less than or equal to 1. That is, if the signal type of the first subband in the M subbands in the $y^{th}$ data frame is harmonic, the encoder determines that the modification factor corresponding to the first subband is a value greater than 1; or if the signal type of the first subband is non-harmonic, the encoder determines that the modification factor corresponding to the first subband is a value less than or equal to 1.

The modification factor of the first subband is determined according to a ratio of any two values of a frequency envelope value of the first subband, an average frequency envelope value of the subbands of the first quantity, a bandwidth value of the subbands of the first quantity, a maximum value of frequency envelope values of the subbands of the first quantity, and a frequency envelope variance value of the subbands of the first quantity. That is, the modification factor of the first subband is determined according to a ratio of any two values of the frequency envelope value of the first subband, an average frequency envelope value of the M subbands, a bandwidth value of the M subbands, a maximum value of frequency envelope values of the M subbands, and a frequency envelope variance value of the M subbands. A specific combination form may be selected according to the signal type of the first subband, that is, a corresponding formula may be selected according to the signal type of the first subband to calculate the modification factor.

A first formula is as follows:

$$\text{factor}(i)=\frac{\text{bandlength}*\text{Ep\_tmp}[i]*\text{Ep\_vari}}{\text{Ep\_avrg}^2},\ i\geq 1 \tag{1}$$

where bandlength is a quantity of subbands between a subband, except the M subbands, in the N subbands and the $i^{th}$ subband in the M subbands.

$$\text{Ep\_tmp}[i]=\sqrt{\frac{Ep[i]}{\text{band\_width}[i]}},$$

where Ep[i] is energy of the $i^{th}$ subband, Ep_tmp[i] is a frequency envelope value of the $i^{th}$ subband, and band_width[i] is a bandwidth of the $i^{th}$ subband.

$$\text{Ep\_vari}=\sum_{i}^{N}|\text{Ep\_tmp}[i]-\text{Ep\_tmp}[i-1]|,$$

where Ep_vari is a frequency envelope variance of a frequency band.

$$\text{Ep\_avrg}=\sum_{i}^{N}\text{Ep\_tmp}[i],$$

where Ep_avrg is an average frequency envelope value of several subbands in a frequency band.

A second formula is as follows:

$$\text{factor}(i)=1.0 \tag{2}$$

Exemplarily, if the signal type of the first subband is harmonic, the first formula is selected, and a value, obtained by means of calculation, of the modification factor corresponding to the first subband is greater than 1; if the signal type of the first subband is non-harmonic, the second formula is selected, and a value, obtained by means of calculation, of the modification factor corresponding to the first subband is less than or equal to 1.

It may be understood that if the signal type of the first subband is harmonic, to better restore a harmonic characteristic of the first subband during decoding, a relatively large quantity of bits needs to be allocated to the first subband. That is, when the signal type of the first subband is harmonic, after it is determined that the modification factor corresponding to the first subband is a value greater than 1, a modified quantized frequency envelope value of the first subband is greater than an unmodified quantized frequency envelope value of the first subband, and then a relatively large quantity of bits is allocated to the first subband.

It should be noted that a method for acquiring a modification factor of each subband in the subbands of the first quantity in the $y^{th}$ data frame is the same as the foregoing method for acquiring the modification factor of the first subband.

(2) The encoder selects the corresponding calculation formula according to the signal type of each subband in the M subbands in the $y^{th}$ data frame and the reference information of the L subbands in the $(y-1)^{th}$ data frame to determine the modification factor corresponding to each subband in the M subbands in the $y^{th}$ data frame.

It should be noted that M≥L, the encoder determines M first modification factors according to the signal type of each subband in the M subbands in the $y^{th}$ data frame, and the encoder determines L second modification factors according to the reference information of the L subbands in the $(y-1)^{th}$ data frame. L first modification factors in the M first modification factors and the L second modification factors are used to correspondingly modify quantized frequency envelope values of L subbands in the M subbands in the $y^{th}$ data frame, and the encoder correspondingly modifies quantized frequency envelope values of M−L remaining subbands in the M subbands in the $y^{th}$ data frame according to M−L remaining first modification factors in the M first modification factors.

The first subband in the $y^{th}$ data frame is described. If the first subband in the $y^{th}$ data frame has corresponding reference information of a second subband in the $(y-1)^{th}$ data frame, the encoder determines a first modification factor of the first subband according to the signal type of the first subband in the $y^{th}$ data frame, and the encoder determines a second modification factor of the first subband according to the reference information of the second subband, corresponding to the first subband in the $y^{th}$ data frame, in the subbands of the second quantity in the $(y-1)^{th}$ data frame, and finally uses a product of the first modification factor and the second modification factor as the modification factor of the first subband. If the first subband in the $y^{th}$ data frame does not have corresponding reference information of a second subband in the $(y-1)^{th}$ data frame, the encoder determines a first modification factor of the first subband according to the signal type of the first subband in the $y^{th}$ data frame, where the modification factor of the first subband is the first modification factor.

It should be noted that when the encoder selects a corresponding calculation formula according to the signal type of each subband in the M subbands in the $y^{th}$ data frame to determine a value of the first modification factor corresponding to each subband in the M subbands, the value of the first modification factor is determined by using the method for determining the modification factor in (1), that is, the modification factor in (1) is the first modification factor herein.

It should be noted that the reference information of the L subbands in the $(y-1)^{th}$ data frame includes reference information of each subband in the L subbands.

Further, before the encoder determines the modification factors of the subbands of the first quantity in the $y^{th}$ data frame according to the signal types of the subbands of the first quantity in the $y^{th}$ data frame, the encoder needs to first acquire the signal types of the subbands of the first quantity in the $y^{th}$ data frame; before the encoder determines modification factors of the subbands of the second quantity in the $(y-1)^{th}$ data frame according to the reference information of the subbands of the second quantity in the $(y-1)^{th}$ data frame, the encoder needs to first acquire the stored reference information of the subbands of the second quantity in the $(y-1)^{th}$ data frame, where the reference information of the subbands of the second quantity in the $(y-1)^{th}$ data frame is stored when the encoder completes encoding of the $(y-1)^{th}$ data frame.

Optionally, the reference information of the second subband in the $(y-1)^{th}$ data frame includes a quantization bit allocation status of the second subband and/or a signal type of the second subband.

When the reference information of the second subband includes the quantization bit allocation status of the second subband, the second modification factor is a third modification factor; or when the reference information of the second subband includes the signal type of the second subband, the second modification factor is a fourth modification factor; or when the reference information of the second subband includes the quantization bit allocation status of the second subband and the signal type of the second subband, the second modification factor is a product of the third modification factor and the fourth modification factor.

The reference information of the L subbands in the $(y-1)^{th}$ data frame includes quantization bit allocation statuses of the L subbands in the $(y-1)^{th}$ data frame and/or signal types of the L subbands in the $(y-1)^{th}$ data frame. When the reference information of the L subbands in the $(y-1)^{th}$ data frame includes the quantization bit allocation statuses of the L subbands in the $(y-1)^{th}$ data frame, the second modification factor is a third modification factor; or when the reference information of the L subbands in the $(y-1)^{th}$ data frame includes the signal types of the L subbands in the $(y-1)^{th}$ data frame, the second modification factor is a fourth modification factor; or when the reference information of the L subbands in the $(y-1)^{th}$ data frame includes the quantization bit allocation statuses of the L subbands in the $(y-1)^{th}$ data frame and the signal types of the L subbands in the $(y-1)^{th}$ data frame, the second modification factor is a product of the third modification factor and the fourth modification factor.

Preferably, the second modification factor is the product of the third modification factor and the fourth modification factor.

The encoder may select a corresponding calculation formula according to a quantization bit allocation status of each subband in the L subbands in the $(y-1)^{th}$ data frame to determine a value of a third modification factor corresponding to each subband in the L subbands, select a corresponding calculation formula according to a signal type of each subband in the L subbands in the $(y-1)^{th}$ data frame to determine a value of a fourth modification factor corresponding to each subband in the L subbands, and determine, according to the third modification factor and/or the fourth modification factor corresponding to each subband in the L subbands, a value of a second modification factor corresponding to each subband in the L subbands.

Optionally, if the quantization bit allocation status of the second subband in the L subbands in the $(y-1)^{th}$ data frame indicates that a spectral coefficient is encoded, the encoder determines that a third modification factor corresponding to the second subband is a value greater than 1; or if the quantization bit allocation status of the second subband indicates that no spectral coefficient is encoded, the encoder determines that a third modification factor corresponding to the second subband is a value less than 1. If the signal type of the second subband is harmonic, the encoder determines that a fourth modification factor corresponding to the second subband is a value greater than 1; or if the signal type of the second subband is non-harmonic, the encoder determines that a fourth modification factor corresponding to the second subband is a value less than or equal to 1.

It should be noted that when the quantization bit allocation status of the second subband in the L subbands in the $(y-1)^{th}$ data frame is "1", it indicates that a spectral coefficient is encoded; when the quantization bit allocation status of the second subband in the L subbands in the $(y-1)^{th}$ data frame is "0", it indicates that no spectral coefficient is encoded. Herein, a method for acquiring the fourth modification factor is the same as the foregoing method for acquiring the modification factor in (1).

The second modification factor of the first subband is determined according to a ratio of any two values of a frequency envelope value of the second subband, an average frequency envelope value of the subbands of the second quantity, a bandwidth value of the subbands of the second quantity, a maximum value of frequency envelope values of the subbands of the second quantity, and a frequency envelope variance value of the subbands of the second quantity. A specific combination form may be selected according to the reference information of the second subband, that is, a corresponding formula is selected according to the quantization bit allocation status of the second subband and/or the signal type of the second subband to calculate the third modification factor and the fourth modification factor.

A third formula is as follows:

$$\text{factor } (i) = \frac{\text{Ep\_avrg} * \text{Ep\_tmp}[i] * \text{Ep\_avrg}}{\text{bandlength}}, \; i \geq 1 \tag{3}$$

where bandlength is a quantity of subbands between a subband, except the L subbands, in the N subbands and the $i^{th}$ subband in the L subbands.

A fourth formula is as follows:

$$\text{factor } (i) = \frac{\text{bandlength}}{\text{Ep\_avrg} * \text{Ep\_tmp}[i] * \text{Ep\_avrg}}, \; i \geq 1 \tag{4}$$

where bandlength is a quantity of subbands between a subband, except the L subbands, in the N subbands and the $i^{th}$ subband in the L subbands.

Exemplarily, if the quantization bit allocation status of the second subband is "1", the third formula is selected, and a value, obtained by means of calculation, of the third modification factor corresponding to the second subband is greater than 1; if the quantization bit allocation status of the second subband is "0", the fourth formula is selected, and a value, obtained by means of calculation, of the third modification factor corresponding to the second subband is less than 1.

If the signal type of the second subband is harmonic, the first formula is selected, and a value, obtained by means of calculation, of the fourth modification factor corresponding to the second subband is greater than 1; if the signal type of the second subband is non-harmonic, the second formula is selected, and a value, obtained by means of calculation, of the fourth modification factor corresponding to the second subband is less than or equal to 1.

It may be understood that if the quantization bit allocation status of the second subband in the $(y-1)^{th}$ data frame is "1", to better maintain continuity between adjacent data frames of an audio signal during encoding, it indicates that a relatively large quantity of bits is allocated to the second subband. That is, when the quantization bit allocation status of the second subband is "1", after it is determined that the third modification factor corresponding to the second subband is a value greater than 1, a modified quantized frequency envelope value of a subband, corresponding to the second subband, in the $y^{th}$ data frame is greater than an unmodified quantized frequency envelope value of the subband, corresponding to the second subband, in the $y^{th}$ data frame, and then a relatively large quantity of bits is allocated to the subband.

It should be noted that a method for acquiring a modification factor of each subband in the subbands of the first quantity in the $y^{th}$ data frame is the same as the foregoing method for acquiring the modification factor of the first subband.

A case in which M≥L is used for description in the following.

If M≤L, a value of the first quantity is L; if a quantity of the M subbands in the $y^{th}$ data frame is referred to as a third quantity, subbands of a third quantity in the $y^{th}$ data frame are the M subbands in the $y^{th}$ data frame. The method for acquiring, by the encoder, the modification factors of the subbands of the first quantity in the $y^{th}$ data frame includes: determining the modification factors of the subbands of the first quantity in the $y^{th}$ data frame according to reference information of subbands of the first quantity in the $(y-1)^{th}$ data frame; or determining, by the encoder, the modification factors of the subbands of the first quantity in the $y^{th}$ data frame according to reference information of subbands of the first quantity in the $(y-1)^{th}$ data frame and signal types of the subbands of the third quantity in the $y^{th}$ data frame.

The encoder selects a corresponding calculation formula according to reference information of each subband in the L subbands in the $(y-1)^{th}$ data frame to determine a value of a modification factor corresponding to each subband in the L subbands in the $y^{th}$ data frame; or the encoder selects a corresponding calculation formula according to a signal type of each subband in the M subbands in the $y^{th}$ data frame and reference information of the L subbands in the $(y-1)^{th}$ data frame to determine a modification factor corresponding to each subband in the L subbands in the $y^{th}$ data frame.

Further, a method for acquiring, by the encoder, the modification factors of the L subbands in the $y^{th}$ data frame is as follows:

(1) The encoder selects the corresponding calculation formula according to the reference information of each subband in the L subbands in the $(y-1)^{th}$ data frame to determine the value of the modification factor corresponding to each subband in the L subbands in the $y^{th}$ data frame.

Further, before the encoder determines modification factors of the subbands of the third quantity in the $y^{th}$ data frame according to the signal types of the subbands of the third quantity in the $y^{th}$ data frame, the encoder needs to first acquire the signal types of the subbands of the third quantity in the $y^{th}$ data frame; before the encoder determines modification factors of the subbands of the first quantity in the $(y-1)^{th}$ data frame according to the reference information of the subbands of the first quantity in the $(y-1)^{th}$ data frame, the encoder needs to first acquire the stored reference information of the subbands of the first quantity in the $(y-1)^{th}$ data frame, where the reference information of the subbands of the first quantity in the $(y-1)^{th}$ data frame is stored when the encoder completes encoding of the $(y-1)^{th}$ data frame.

It should be noted that when the encoder selects the corresponding calculation formula according to the reference information of each subband in the L subbands in the $(y-1)^{th}$ data frame to determine the value of the modification factor corresponding to each subband in the L subbands in the $y^{th}$ data frame, the value of the modification factor is determined by using the method for determining the foregoing second modification factor in (2) in which M≥L, that is, the foregoing second modification factor in (2) in which M≥L is the modification factor herein.

(2) The encoder selects the corresponding calculation formula according to the signal type of each subband in the M subbands in the $y^{th}$ data frame and the reference information of the L subbands in the $(y-1)^{th}$ data frame to determine the modification factor corresponding to each subband in the L subbands in the $y^{th}$ data frame.

It should be noted that M≤L, the encoder determines M first modification factors according to the signal type of each subband in the M subbands in the $y^{th}$ data frame, and the encoder determines L second modification factors according to the reference information of the L subbands in the $(y-1)^{th}$ data frame. M second modification factors in the L second modification factors and the M first modification factors are used to correspondingly modify quantized frequency envelope values of M subbands in the L subbands in the $y^{th}$ data frame, and the encoder correspondingly modifies quantized frequency envelope values of L−M remaining subbands in the L subbands in the $y^{th}$ data frame according to L−M remaining second modification factors in the L second modification factors.

A first subband in the $y^{th}$ data frame is described. If a second subband in the $(y-1)^{th}$ data frame has a corresponding signal type of the first subband in the $y^{th}$ data frame, the encoder determines a second modification factor of the first subband in the L subbands in the $y^{th}$ data frame according to the reference information of the second subband in the L subbands in the $(y-1)^{th}$ data frame, and the encoder determines a first modification factor of the first subband according to the signal type of the first subband in the $y^{th}$ data frame, and finally uses a product of the first modification factor and the second modification factor as a modification factor of the first subband. If a second subband in the $(y-1)^{th}$ data frame does not have a corresponding signal type of the first subband in the $y^{th}$ data frame, the encoder determines a second modification factor of the first subband in the $y^{th}$ data frame according to the reference information of the second subband in the $(y-1)^{th}$ data frame, and the modification factor of the first subband is the second modification factor.

It should be noted that the foregoing method for determining a value of the first modification factor and a value of the second modification factor is the same as the method, in which M≥L, for determining the value of the first modification factor and the value of the second modification factor, and details are not described herein again.

S205. The encoder modifies quantized frequency envelope values of the subbands of the first quantity in the $y^{th}$ data frame.

After the encoder acquires the modification factors of the subbands of the first quantity in the $y^{th}$ data frame, the encoder modifies the quantized frequency envelope values of the subbands of the first quantity in the $y^{th}$ data frame.

The encoder modifies the quantized frequency envelope values of the subbands of the first quantity by using the modification factors of the subbands of the first quantity in the $y^{th}$ data frame.

It should be noted that, in this embodiment of the present disclosure, when the encoder modifies the quantized frequency envelope values of the subbands of the first quantity in the $y^{th}$ data frame, preferably, as shown in FIG. 3, the encoder needs to modify, according to importance of subbands in the $y^{th}$ data frame, only M or L subbands that have high importance in the $y^{th}$ data frame, and recombine M or L subbands in the $y^{th}$ data frame that are modified by the encoder and remaining unmodified subbands in the $y^{th}$ data frame to form modified N subbands in the $y^{th}$ data frame.

In the encoding method provided in this embodiment of the present disclosure, the encoder may first determine, according to values of M and L, a quantity (a larger value between M and L) of subbands in the $y^{th}$ data frame that need to be modified, then select a modification manner corresponding to a case in which M>L, or M<L, or M=L, and then determine modification factors corresponding to the modification manner to modify the quantized frequency envelope values of the subbands of the first quantity in the $y^{th}$ data frame.

Optionally, the encoder selects a corresponding modification manner according to values of M and L to modify the quantized frequency envelope values of the subbands of the first quantity in the $y^{th}$ data frame.

If M≥L, a value of the first quantity is M, and the encoder modifies quantized frequency envelope values of M subbands in the $y^{th}$ data frame according to signal types of the M subbands in the $y^{th}$ data frame, or signal types of the M subbands in the $y^{th}$ data frame and reference information of L subbands in the $(y-1)^{th}$ data frame. The M subbands in the $y^{th}$ data frame are M consecutive subbands starting from a subband that has a highest frequency in the N subbands in the $y^{th}$ data frame, L subbands in the $y^{th}$ data frame are L consecutive subbands starting from the subband that has the highest frequency in the N subbands in the $y^{th}$ data frame, and the L subbands in the $(y-1)^{th}$ data frame are L consecutive subbands starting from a subband that has a highest frequency in N subbands in the $(y-1)^{th}$ data frame.

Alternatively, if M≤L, a value of the first quantity is L, and the encoder modifies quantized frequency envelope values of L subbands in the $y^{th}$ data frame according to reference information of L subbands in the $(y-1)^{th}$ data frame, or signal types of M subbands in the $y^{th}$ data frame and reference information of L subbands in the $(y-1)^{th}$ data frame.

Optionally, the encoder may select, according to values of M and L, that is, a modification condition, a modification manner corresponding to the modification condition, and determine corresponding modification factors according to the modification manner to modify the quantized frequency envelope values of the subbands of the first quantity in the $y^{th}$ data frame. The modification manner in which the encoder modifies the quantized frequency envelope values of the subbands of the first quantity in the $y^{th}$ data frame may be one of the following:

(1) When M≥L, a value of the first quantity is M, and the encoder uses the modification factors to correspondingly modify a quantization frequency envelope value of each subband in M subbands in the $y^{th}$ data frame, where the modification factors are determined by the encoder according to a signal type of each subband in the M subbands in the $y^{th}$ data frame. The encoder correspondingly multiplies the quantized frequency envelope values of the M subbands in the $y^{th}$ data frame by M modification factors to obtain modified quantized frequency envelope values of the M subbands in the $y^{th}$ data frame. Alternatively, the encoder correspondingly modifies quantized frequency envelope values of L subbands in the M subbands in the $y^{th}$ data frame according to L first modification factors in M first modification factors and L second modification factors, and the encoder correspondingly modifies quantized frequency envelope values of M−L remaining subbands in the M subbands in the $y^{th}$ data frame according to M−L remaining first modification factors in the M first modification factors. The encoder correspondingly multiplies the quantized frequency envelope values of the L subbands in the M subbands in the $y^{th}$ data frame by the L first modification factors in the M first modification factors and the L second modification factors to obtain modified quantized frequency envelope values of the L subbands in the M subbands in the $y^{th}$ data frame, and the encoder correspondingly multiplies the quantized frequency envelope values of the M−L remaining subbands in the M subbands in the $y^{th}$ data frame by the M−L remaining first modification factors in the M first modification factors to obtain modified quantized frequency envelope values of the M−L remaining subbands in the M subbands in the $y^{th}$ data frame.

(2) When M≤L, a value of the first quantity is L, and the encoder uses the modification factors to correspondingly modify a quantization frequency envelope value of each subband in L subbands in the $y^{th}$ data frame, where the modification factors are determined by the encoder according to reference information of each subband in L subbands in the $(y-1)^{th}$ data frame. The encoder correspondingly multiplies the quantized frequency envelope values of the L subbands in the $y^{th}$ data frame by L modification factors to obtain modified quantized frequency envelope values of the L subbands in the $y^{th}$ data frame. Alternatively, the encoder correspondingly modifies quantized frequency envelope values of M subbands in the $y^{th}$ data frame according to M second modification factors in L second modification factors and M first modification factors, and the encoder correspondingly modifies quantized frequency envelope values of L−M remaining subbands in the L subbands in the $y^{th}$ data frame according to L−M remaining second modification factors in the L second modification factors. The encoder correspondingly multiplies the quantized frequency envelope values of the M subbands in the $y^{th}$ data frame by the M second modification factors in the L second modification factors and the M first modification factors to obtain modified quantized frequency envelope values of the M subbands in the $y^{th}$ data frame, and the encoder correspondingly multiplies the quantized frequency envelope values of the L−M remaining subbands in the L subbands in the $y^{th}$ data frame by the L−M remaining second modification factors in the L second modification factors to obtain modified quantized frequency envelope values of the L−M remaining subbands in the L subbands in the $y^{th}$ data frame.

Exemplarily, if M=3, and L=2, M>L, and three subbands in the $y^{th}$ data frame need to be modified. A modification manner used when M>L is first selected, then the encoder correspondingly modifies quantized frequency envelope values of two subbands in three subbands in the $y^{th}$ data frame according to two first modification factors in three first modification factors and two second modification factors, and the encoder modifies a quantization frequency envelope value of one remaining subband in the three subbands in the $y^{th}$ data frame according to one remaining first modification factor in the three first modification factors. The encoder correspondingly multiplies the quantized frequency envelope values of the two subbands in the three subbands in the $y^{th}$ data frame by the two first modification factors in the three first modification factors and the two second modification factors to obtain modified quantized frequency envelope values of the two subbands in the three subbands in the $y^{th}$ data frame, and the encoder multiplies the quantization frequency envelope value of the one remaining subband in the three subbands in the $y^{th}$ data frame by the one remaining first modification factor in the three first modification factors to obtain a modified quantization frequency envelope value of the one remaining subband in the three subband in the $y^{th}$ data frame.

It may be understood that when M=L or M<L, a process in which the encoder modifies quantized frequency envelope values of M subbands in the $y^{th}$ data frame is similar to the foregoing modification process in which M>L, which is subsequently described in detail by using an example.

S206. The encoder allocates quantization bits to the subbands according to modified quantized frequency envelope values of the subbands of the first quantity.

After the encoder modifies the quantized frequency envelope values of the subbands of the first quantity in the $y^{th}$ data frame, the encoder may perform quantization bit allocation for the N subbands in the $y^{th}$ data frame according to the modified quantized frequency envelope values of the subbands of the first quantity.

After the encoder modifies the quantized frequency envelope values of the N subbands in the $y^{th}$ data frame, the encoder may calculate initial values of importance of the N subbands (importance of a subband may be measured by using a parameter such as energy or a frequency of the subband) according to the modified quantized frequency envelope values of the N subbands in the $y^{th}$ data frame, and then allocate available bits to the N subbands according to the initial values of importance of the N subbands, where more bits are allocated to a subband of high importance, and fewer bits are allocated to a subband of low importance.

It should be noted that a quantity of available bits refers to a total quantity of bits that are available in the $y^{th}$ data frame. The quantity of available bits is determined according to a bit rate of the encoder. A larger bit rate of the encoder indicates a larger quantity of available bits.

It may be understood that after the quantized frequency envelope values of the N subbands in the $y^{th}$ data frame are modified, on one hand, because the modified quantized frequency envelope values, used for quantization bit allocation, of the N subbands in the $y^{th}$ data frame better meet a characteristic of an audio signal, quantization bit allocation for spectral coefficients of the N subbands is more proper; on the other hand, because the modified quantized frequency envelope values of the N subbands in the $y^{th}$ data frame may make spectral coefficients of the $(y-1)^{th}$ data frame more continuous with the spectral coefficients of the $y^{th}$ data frame, some discrete points on a spectrum during decoding by a decoder are reduced, so that the decoder can better complete decoding.

S207. The encoder quantizes a spectral coefficient of a subband to which a quantization bit is allocated in the N subbands.

After the encoder performs quantization bit allocation for the spectral coefficient of the subband to which a quantization bit is allocated in the N subbands in the $y^{th}$ data frame, the encoder quantizes the spectral coefficient of the subband to which a quantization bit is allocated in the N subbands in the $y^{th}$ data frame.

After the encoder performs quantization bit allocation for the spectral coefficients of the N subbands in the $y^{th}$ data frame, the encoder may perform normalization processing on the spectral coefficients of the N subbands in the $y^{th}$ data frame according to the modified quantized frequency envelope values of the N subbands in the $y^{th}$ data frame, and then quantize the spectral coefficients of the N subbands in the $y^{th}$ data frame according to quantities of bits separately allocated by the encoder to spectral coefficients of subbands to which quantization bits are allocated in the N subbands in the $y^{th}$ data frame.

Exemplarily, when quantizing, according to a quantity of bits allocated to the spectral coefficient of the subband to which a quantization bit is allocated in the N subbands in the $y^{th}$ data frame, the spectral coefficient of the subband to which a quantization bit is allocated in the N subbands in the $y^{th}$ data frame, the encoder may use a pyramid lattice vector quantization method to quantize a spectral coefficient of a subband to which fewer bits are allocated, so as to obtain the quantized spectral coefficient of the subband to which fewer bits are allocated; correspondingly, the encoder may use a spherical lattice vector quantization method to quantize a spectral coefficient of a subband to which more bits are allocated, so as to obtain the quantized spectral coefficient of the subband to which more bits are allocated.

It should be noted that there may be a subband to which no quantization bit is allocated in the N subbands in the $y^{th}$ data frame. In this embodiment of the present disclosure, the encoder quantizes a spectral coefficient of a subband to which a quantization bit is allocated in the N subbands in the $y^{th}$ data frame.

S208. The encoder writes the quantized spectral coefficient of the subband to which a quantization bit is allocated into a bitstream.

After the encoder quantizes the spectral coefficient of the subband to which a quantization bit is allocated in the $y^{th}$ data frame, the encoder needs to write the quantized spectral coefficient of the subband to which a quantization bit is allocated into the bitstream, so that the decoder uses the bitstream to perform decoding.

After the encoder quantizes the spectral coefficient of the subband to which a quantization bit is allocated in the $y^{th}$ data frame, the encoder writes the quantized spectral coefficient of the subband to which a quantization bit is allocated, the signal types of the M subbands in the $y^{th}$ data frame, the reference information of the L subbands in the $(y-1)^{th}$ data frame, and the quantization frequency envelope index values of the N subbands in the $y^{th}$ data frame into the bitstream, and transmits the bitstream to the decoder for decoding.

It should be noted that for each data frame of an audio signal, the encoder performs encoding according to the foregoing steps S201 to S208, that is, the encoder repeatedly executes S201 to S208 until all data frames of the audio signal are encoded. After the encoding is completed, the encoder stores reference information of the subbands of the first quantity in the $y^{th}$ data frame, so that the reference information is used when the $y+1^{th}$ data frame is being encoded.

It may be understood that after the encoder calculates, quantizes, and modifies a to-be-encoded audio signal, the encoder needs to write corresponding parameters such as the signal types of the M subbands in the $y^{th}$ data frame, the reference information of the L subbands in the $(y-1)^{th}$ data frame, and the quantization frequency envelope index values of the N subbands in the $y^{th}$ data frame that are obtained in the foregoing process and the quantized spectral coefficient of the subband to which a quantization bit is allocated in the $y^{th}$ data frame into the bitstream, and transmit the bitstream to the decoder, so that the decoder can perform processing such as dequantization and denormalization on the bitstream of an encoded audio signal according to the corresponding parameters obtained during encoding, and then the encoder obtains, after completing decoding, the audio signal before being encoded.

The following describes in detail a process of modifying a quantization frequency envelope value in the encoding method provided in this embodiment of the present disclosure by using an example of a specific wideband audio signal, for example, the encoder determines the modification factors of the subbands of the first quantity in the $y^{th}$ data frame according to the signal types of the M subbands in the $y^{th}$ data frame and the reference information of the L subbands in the $(y-1)^{th}$ data frame.

It is assumed that y=6, and N=18, that is, the encoder encodes the sixth data frame of the wideband audio signal. After the sixth data frame of the wideband audio signal is input into the encoder, the encoder first performs MDCT transformation on the sixth data frame to obtain 320 spectral coefficients within 0 to 8000 Hz. As shown in FIG. 3, the encoder splits the 320 spectral coefficients of the sixth data frame into 18 subbands with unequal intervals according to auditory sensing characteristics. Before the sixth data frame is input into the encoder, the encoder obtains 320 spectral coefficients within 0 to 8000 Hz after performing MDCT transformation on the fifth data frame, input into the encoder, of the wideband audio signal, and also splits the 320 spectral coefficients of the fifth data frame into 18 subbands with unequal intervals according to auditory sensing characteristics. After calculating and quantizing frequency envelopes of the 18 subbands in the sixth data frame, the encoder obtains quantization frequency envelope index values of the 18 subbands in the sixth data frame and quantized frequency envelope values fenv of the 18 subbands in the sixth data frame.

(1) If three subbands that have higher frequencies in the sixth data frame and two subbands that have higher frequencies in the fifth data frame are selected, that is, M=3, and L=2, the M subbands in the $y^{th}$ data frame are the sixteenth subband, the seventeenth subband, and the eighteenth subband in the sixth data frame, and the L subbands in the $(y-1)^{th}$ data frame are the seventeenth subband and the eighteenth subband in the fifth data frame. It is assumed that signal types of the sixteenth subband, the seventeenth subband, and the eighteenth subband in the sixth data frame are respectively harmonic, non-harmonic, and harmonic, quantization bit allocation statuses of the seventeenth subband and the eighteenth subband in the fifth data frame are respectively "1" and "0", and signal types of the seventeenth subband and the eighteenth subband in the fifth data frame are respectively harmonic and non-harmonic.

Because M>L, preferably, the encoder needs to modify quantized frequency envelope values of only three subbands in the sixth data frame, that is, the encoder needs to modify only the sixteenth subband, the seventeenth subband, and the eighteenth subband in the sixth data frame.

For ease of description, the following describes in detail a method for determining modification factors of the sixteenth subband, the seventeenth subband, and the eighteenth subband.

First, the encoder determines a first modification factor factor 1 as follows: the sixteenth subband in the sixth data frame is harmonic, and therefore, a first modification factor factor 1 corresponding to the sixteenth subband is a value greater than 1; the seventeenth subband in the sixth data frame is non-harmonic, and therefore, a first modification factor factor 1 corresponding to the seventeenth subband is a value less than or equal to 1; likewise, a factor 1 corresponding to the eighteenth subband in the sixth data frame is a value greater than 1. If a signal type of a subband is harmonic, a factor 1 is obtained by means of calculation by using the first formula; if a signal type of a subband is non-harmonic, a factor 1 is obtained by means of calculation by using the second formula.

Then, the encoder determines a second modification factor factor 2 as follows: the encoder needs to first determine a third modification factor and a fourth modification factor. For determining a third modification factor, because the quantization bit allocation statuses of the seventeenth subband and the eighteenth subband in the fifth data frame are respectively "1" and "0", a third modification factor factor 3 corresponding to the seventeenth subband in the fifth data frame is a value greater than 1, and a third modification factor factor 3 corresponding to the eighteenth subband in the fifth data frame is a value less than 1. If a quantization bit allocation status of a subband is "1", a factor 3 is obtained by means of calculation by using the third formula; if a quantization bit allocation status of a subband is "0", a factor 3 is obtained by means of calculation by using the fourth formula. For determining a fourth modification factor, because the signal types of the seventeenth subband and the eighteenth subband in the fifth data frame are respectively harmonic and non-harmonic, a fourth modification factor factor 4 corresponding to the seventeenth subband in the fifth data frame is a value greater than 1, and a fourth modification factor factor 4 corresponding to the eighteenth subband in the fifth data frame is a value less than 1. If a signal type of a subband is harmonic, a factor 4 is obtained by means of calculation by using the first formula; if a signal type of a subband is non-harmonic, a factor 4 is obtained by means of calculation by using the second formula.

Preferably, a second modification factor used to modify the seventeenth subband in the fifth data frame is a product of the third modification factor factor 3 corresponding to the seventeenth subband in the fifth data frame and the fourth modification factor factor 4 corresponding to the seventeenth subband in the fifth data frame, and a second modification factor used to modify the eighteenth subband in the fifth data frame is a product of the third modification factor factor 3 corresponding to the eighteenth subband in the fifth data frame and the fourth modification factor factor 4 corresponding to the eighteenth subband in the fifth data frame.

Finally, the encoder may correspondingly modify quantized frequency envelope values of L subbands in M subbands in the $y^{th}$ data frame according to L first modification factors in M first modification factors and L second modification factors, and the encoder correspondingly modifies quantized frequency envelope values of M−L remaining subbands in the M subbands in the $y^{th}$ data frame according to M−L remaining first modification factors in the M first modification factors. In this example, M=3, and L=2; therefore, in the sixth data frame, the encoder multiplies a quantization frequency envelope value of the seventeenth subband in the sixth data frame by the first modification factor corresponding to the seventeenth subband in the sixth data frame and the second modification factor corresponding to the seventeenth subband in the fifth data frame to obtain a modified quantization frequency envelope value of the seventeenth subband in the sixth data frame; concurrently, the encoder multiplies a quantization frequency envelope value of the eighteenth subband in the sixth data frame by the first modification factor corresponding to the eighteenth subband in the sixth data frame and the second modification factor corresponding to the eighteenth subband in the fifth data frame to obtain a modified quantization frequency envelope value of the eighteenth subband in the sixth data frame; concurrently, the encoder multiplies a quantization frequency envelope value of the sixteenth subband in the sixth data frame by the first modification factor corresponding to the sixteenth subband in the sixth data frame to obtain a modified quantization frequency envelope value of the sixteenth subband in the sixth data frame, so that the encoder modifies the quantized frequency envelope values of the sixteenth subband, the seventeenth subband, and the eighteenth subband in the sixth data frame. That is:

For the sixteenth subband in the sixth data frame, modified fenv 16=factor 1×fenv 16, where the factor 1 is the first modification factor corresponding to the sixteenth subband in the sixth data frame, the modified fenv 16 is the modified quantization frequency envelope value of the sixteenth subband in the sixth data frame, and the fenv 16 is the unmodified quantization frequency envelope value of the sixteenth subband in the sixth data frame.

For the seventeenth subband in the sixth data frame, modified fenv 17=factor 1×factor 2×fenv 17, where factor 2=factor 3×factor 4, the factor 1 is the first modification factor corresponding to the seventeenth subband in the sixth data frame, the factor 2 is the second modification factor corresponding to the seventeenth subband in the fifth data frame, the factor 3 is the third modification factor corresponding to the seventeenth subband in the fifth data frame, the factor 4 is the fourth modification factor corresponding to the seventeenth subband in the fifth data frame, the modified fenv 17 is the modified quantization frequency envelope value of the seventeenth subband in the sixth data frame, and the fenv 17 is the unmodified quantization frequency envelope value of the seventeenth subband in the sixth data frame.

Likewise, for the eighteenth subband in the sixth data frame, modified fenv 18=factor 1×factor 2×fenv 18, where the modified fenv 18 is the modified quantization frequency envelope value of the eighteenth subband in the sixth data frame, and fenv 18 is the unmodified quantization frequency envelope value of the eighteenth subband in the sixth data frame.

(2) If three subbands that have higher frequencies in the sixth data frame and three subbands that have higher frequencies in the fifth data frame are selected, that is, M=3, and L=3, the M subbands in the $y^{th}$ data frame are the sixteenth subband, the seventeenth subband, and the eighteenth subband in the sixth data frame, and the L subbands in the $(y-1)^{th}$ data frame are the sixteenth subband, the seventeenth subband, and the eighteenth subband in the fifth data frame. A method for determining first modification factors corresponding to the sixteenth subband, the seventeenth subband, and the eighteenth subband in the sixth data frame and second modification factors corresponding to the sixteenth subband, the seventeenth subband, and the eighteenth subband in the fifth data frame is the same as the method used when M>L, and details are not described herein again.

Because M=L, the encoder may correspondingly modify the quantized frequency envelope values of the M subbands in the $y^{th}$ data frame according to M first modification factors and L second modification factors. In this example, M=3, and L=3; therefore, in the sixth data frame, the encoder multiplies a quantization frequency envelope value of the sixteenth subband in the sixth data frame by the first modification factor corresponding to the sixteenth subband in the sixth data frame and the second modification factor corresponding to the sixteenth subband in the fifth data frame to obtain a modified quantization frequency envelope value of the sixteenth subband in the sixth data frame; concurrently, the encoder multiplies a quantization frequency envelope value of the seventeenth subband in the sixth data frame by the first modification factor corresponding to the seventeenth subband in the sixth data frame and the second modification factor corresponding to the seventeenth subband in the fifth data frame to obtain a modified quantization frequency envelope value of the seventeenth subband in the sixth data frame; concurrently, the encoder multiplies a quantization frequency envelope value of the eighteenth subband in the sixth data frame by the first modification factor corresponding to the eighteenth subband in the sixth data frame and the second modification factor corresponding to the eighteenth subband in the fifth data frame to obtain a modified quantization frequency envelope value of the eighteenth subband in the sixth data frame, so that the encoder modifies the quantized frequency envelope values of the sixteenth subband, the seventeenth subband, and the eighteenth subband in the sixth data frame. That is:

For the sixteenth subband in the sixth data frame,

Modified fenv 16=factor 1×factor 2×fenv 16, where:

factor 2=factor 3×factor 4, the factor 1 is the first modification factor corresponding to the sixteenth subband in the sixth data frame, the factor 2 is the second modification factor corresponding to the sixteenth subband in the fifth data frame, the factor 3 is a third modification factor corresponding to the sixteenth subband in the fifth data frame, the factor 4 is a fourth modification factor corresponding to the sixteenth subband in the fifth data frame, the modified fenv 16 is the modified quantization frequency envelope value of the sixteenth subband in the sixth data frame, and the fenv 16 is the unmodified quantization frequency envelope value of the sixteenth subband in the sixth data frame.

Likewise, for the seventeenth subband in the sixth data frame, modified fenv 17=factor 1×factor 2×fenv 17, where the modified fenv 17 is the modified quantization frequency envelope value of the seventeenth subband in the sixth data frame, and fenv 17 is the unmodified quantization frequency envelope value of the seventeenth subband in the sixth data frame.

Likewise, for the eighteenth subband in the sixth data frame, modified fenv 18=factor 1×factor 2×fenv 18, where the modified fenv 18 is the modified quantization frequency envelope value of the eighteenth subband in the sixth data frame, and fenv 18 is the unmodified quantization frequency envelope value of the eighteenth subband in the sixth data frame.

(3) If three subbands that have higher frequencies in the sixth data frame and four subbands that have higher frequencies in the fifth data frame are selected, that is, M=3, and L=4, the M subbands in the $y^{th}$ data frame are the sixteenth subband, the seventeenth subband, and the eighteenth subband in the sixth data frame, and the L subbands in the $(y-1)^{th}$ data frame are the fifteenth subband, the sixteenth subband, the seventeenth subband, and the eighteenth subband in the fifth data frame. A method for determining first modification factors that are respectively corresponding to the sixteenth subband, the seventeenth subband, and the eighteenth subband in the sixth data frame, second modification factors that are respectively corresponding to the sixteenth subband, the seventeenth subband, and the eighteenth subband in the fifth data frame, and a second modification factor corresponding to the fifteenth subband in the fifth data frame is the same as the method used when M>L, and details are not described herein again.

Because M<L, preferably, the encoder needs to modify quantized frequency envelope values of only four subbands in the sixth data frame, that is, the encoder needs to modify only the fifteenth subband, the sixteenth subband, the seventeenth subband, and the eighteenth subband in the sixth data frame. When M<L, the encoder correspondingly modifies quantized frequency envelope values of M subbands in the $y^{th}$ data frame according to M second modification factors in L second modification factors and M first modification factors, and the encoder correspondingly modifies quantized frequency envelope values of L−M remaining subbands in the L subbands in the $y^{th}$ data frame according to L−M remaining second modification factors in the L second modification factors. In this example, M=3, and L=4; therefore, in the sixth data frame, the encoder multiplies a quantization frequency envelope value of the sixteenth subband in the sixth data frame by the first modification factor corresponding to the sixteenth subband in the sixth data frame and the second modification factor corresponding to the sixteenth subband in the fifth data frame to obtain a modified quantization frequency envelope value of the sixteenth subband in the sixth data frame; concurrently, the encoder multiplies a quantization frequency envelope value of the seventeenth subband in the sixth data frame by the first modification factor corresponding to the seventeenth subband in the sixth data frame and the second modification factor corresponding to the seventeenth subband in the fifth data frame to obtain a modified quantization frequency envelope value of the seventeenth subband in the sixth data frame; concurrently, the encoder multiplies a quantization frequency envelope value of the eighteenth subband in the sixth data frame by the first modification factor corresponding to the eighteenth subband in the sixth data frame and the second modification factor corresponding to the eighteenth subband in the fifth data frame to obtain a modified quantization frequency envelope value of the eighteenth subband in the sixth data frame; concurrently, the encoder multiplies a quantization frequency envelope value of the fifteenth subband in the sixth data frame by the second modification factor of the fifteenth subband in the fifth data frame to obtain a modified quantization frequency envelope value of the fifteenth subband in the sixth data frame, so that the encoder modifies the quantized frequency envelope values of the fifteenth subband, the sixteenth subband, the seventeenth subband, and the eighteenth subband in the sixth data frame. That is:

For the fifteenth subband in the sixth data frame, modified fenv 15=factor 2×fenv 15, where factor 2=factor 3×factor 4, the factor 2 is the second modification factor corresponding to the fifteenth subband in the fifth data frame, the factor 3 is a third modification factor corresponding to the fifteenth subband in the fifth data frame, the factor 4 is a fourth modification factor corresponding to the fifteenth subband in the fifth data frame, the modified fenv 15 is the modified quantization frequency envelope value of the fifteenth subband in the sixth data frame, and the fenv 15 is the unmodified quantization frequency envelope value of the fifteenth subband in the sixth data frame.

For the sixteenth subband in the sixth data frame, modified fenv 16=factor 1×factor 2×fenv 16, where the factor 1 is the first modification factor corresponding to the sixteenth subband in the sixth data frame, the factor 2 is the second modification factor corresponding to the sixteenth subband in the fifth data frame, the modified fenv 16 is the modified quantization frequency envelope value of the sixteenth subband in the sixth data frame, and the fenv 16 is the unmodified quantization frequency envelope value of the sixteenth subband in the sixth data frame.

Likewise, for the seventeenth subband in the sixth data frame, modified fenv 17=factor 1×factor 2×fenv 17, where the modified fenv 17 is the modified quantization frequency envelope value of the seventeenth subband in the sixth data frame, and fenv 17 is the unmodified quantization frequency envelope value of the seventeenth subband in the sixth data frame.

Likewise, for the eighteenth subband in the sixth data frame, modified fenv 18=factor 1×factor 2×fenv 18, where the modified fenv 18 is the modified quantization frequency envelope value of the eighteenth subband in the sixth data frame, and fenv 18 is the unmodified quantization frequency envelope value of the eighteenth subband in the sixth data frame.

According to the encoding method provided in this embodiment of the present disclosure, after splitting spectral coefficients of a current data frame into subbands, an encoder acquires quantized frequency envelope values of the subbands; the encoder modifies quantized frequency envelope values of subbands of a first quantity in the subbands; the encoder allocates quantization bits to the subbands according to modified quantized frequency envelope values of the subbands of the first quantity; the encoder quantizes a spectral coefficient of a subband to which a quantization bit is allocated in the subbands; and finally, the encoder writes the quantized spectral coefficient of the subband to which a quantization bit is allocated into a bitstream. According to this solution, before quantization bit allocation is performed for spectral coefficients of subbands in a current data frame of an audio signal, quantized frequency envelope values of the subbands can be modified according to a signal type of the current data frame and information about a previous data frame; therefore, performing quantization bit allocation for the spectral coefficients of the subbands according to modified quantized frequency envelope values of the subbands and a quantity of available bits can achieve an objective of proper quantization bit allocation for spectral coefficients of an audio signal, thereby improving quality of a signal obtained by a decoder by means of decoding.

Embodiment 3

Figure 4:
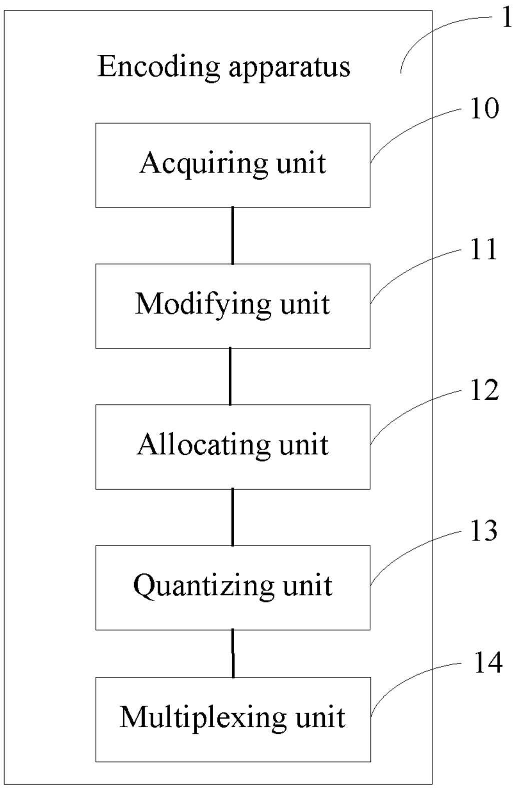
FIG. 4 is a first schematic structural diagram of an encoding apparatus according to an embodiment of the present disclosure.

As shown in FIG. 4, this embodiment of the present disclosure provides an encoding apparatus 1. The encoding apparatus 1 may include:

an acquiring unit 10, configured to: after splitting spectral coefficients of a current data frame into subbands, acquire quantized frequency envelope values of the subbands;

a modifying unit 11, configured to modify quantized frequency envelope values of subbands of a first quantity in the subbands acquired by the acquiring unit 10;

an allocating unit 12, configured to allocate quantization bits to the subbands according to quantized frequency envelope values, modified by the modifying unit 11, of the subbands of the first quantity;

a quantizing unit 13, configured to quantize a spectral coefficient of a subband to which a quantization bit is allocated by the allocating unit 12 in the subbands; and a multiplexing unit 14, configured to write the spectral coefficient, quantized by the quantizing unit 13, of the subband to which a quantization bit is allocated into a bitstream.

Optionally, the acquiring unit 10 is further configured to acquire modification factors of the subbands of the first quantity.

The modifying unit 11 is further configured to modify, by using the modification factors of the subbands of the first quantity acquired by the acquiring unit 10, the quantized frequency envelope values, acquired by the acquiring unit 10, of the subbands of the first quantity.

Figure 5:
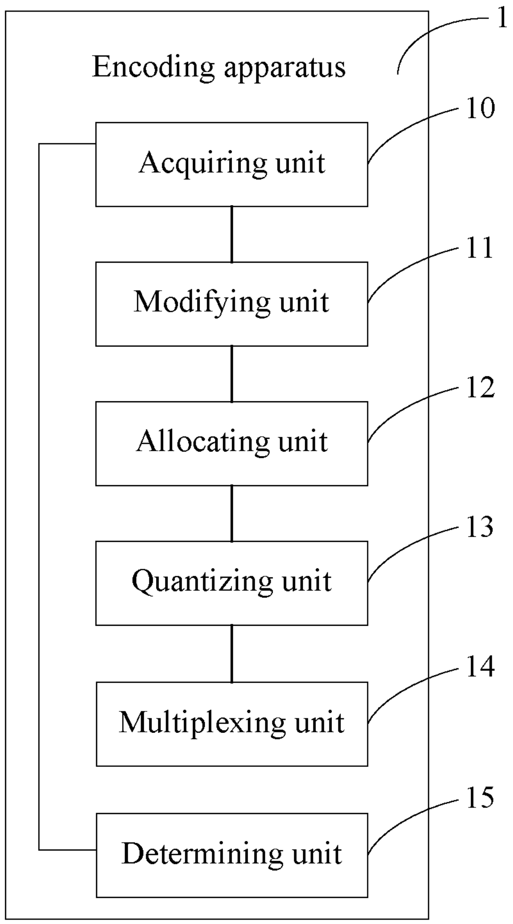
FIG. 5 is a second schematic structural diagram of an encoding apparatus according to an embodiment of the present disclosure.

Optionally, as shown in FIG. 5, the encoding apparatus 1 further includes a determining unit 15.

The acquiring unit 10 is further configured to acquire signal types of the subbands of the first quantity.

The determining unit 15 is configured to determine the modification factors of the subbands of the first quantity according to the signal types of the subbands of the first quantity acquired by the acquiring unit 10.

The determining unit 15 is further configured to: when a signal type, acquired by the acquiring unit 10, of a first subband in the subbands of the first quantity is harmonic, determine that a modification factor of the first subband is greater than 1; or when a signal type, acquired by the acquiring unit 10, of a first subband in the subbands of the first quantity is non-harmonic, determine that a modification factor of the first subband is less than or equal to 1.

Optionally, the acquiring unit 10 is further configured to: before the determining the modification factors of the subbands of the first quantity according to the signal types of the subbands of the first quantity, acquire stored reference information of subbands of a second quantity in a previous data frame of the current data frame, where the second quantity is less than or equal to the first quantity.

The determining unit 15 is further configured to determine the modification factors of the subbands of the first quantity according to the signal types of the subbands of the first quantity and the reference information of the subbands of the second quantity that are acquired by the acquiring unit 10.

Optionally, the determining unit 15 is further configured to: determine a first modification factor of the first subband according to the signal type of the first subband in the subbands of the first quantity acquired by the acquiring unit 10; determine a second modification factor of the first subband according to reference information, acquired by the acquiring unit 10, of a second subband, corresponding to the first subband, in the subbands of the second quantity; and use a product of the first modification factor and the second modification factor as the modification factor of the first subband.

Optionally, the reference information of the second subband acquired by the acquiring unit 10 includes a quantization bit allocation status of the second subband and/or a signal type of the second subband, where when the reference information of the second subband includes the quantization bit allocation status of the second subband, the second modification factor determined by the determining unit 15 is a third modification factor; or when the reference information of the second subband includes the signal type of the second subband, the second modification factor is a fourth modification factor; or when the reference information of the second subband includes the quantization bit allocation status of the second subband and the signal type of the second subband, the second modification factor is a product of the third modification factor and the fourth modification factor.

Optionally, the determining unit 15 is further configured to: when the quantization bit allocation status of the second subband indicates that no spectral coefficient is encoded, determine that the third modification factor is less than 1, or when the quantization bit allocation status of the second subband indicates that a spectral coefficient is encoded, determine that the third modification factor is greater than 1; and when the signal type of the second subband acquired by the acquiring unit 10 is harmonic, determine that the fourth modification factor is greater than 1, or when the signal type of the second subband acquired by the acquiring unit 10 is non-harmonic, determine that the fourth modification factor is less than or equal to 1.

Optionally, the second modification factor of the first subband determined by the determining unit 15 is determined according to a ratio of any two values of a frequency envelope value of the second subband, an average frequency envelope value of the subbands of the second quantity, a bandwidth value of the subbands of the second quantity, a maximum value of frequency envelope values of the subbands of the second quantity, and a frequency envelope variance value of the subbands of the second quantity.

Optionally, the first modification factor of the first subband determined by the determining unit 15 is determined according to a ratio of any two values of a frequency envelope value of the first subband, an average frequency envelope value of the subbands of the first quantity, a bandwidth value of the subbands of the first quantity, a maximum value of frequency envelope values of the subbands of the first quantity, and a frequency envelope variance value of the subbands of the first quantity.

Optionally, the acquiring unit 10 is further configured to acquire stored reference information of subbands of a first quantity in a previous data frame of the current data frame.

The determining unit 15 is further configured to determine the modification factors of the subbands of the first quantity in the current data frame according to the reference information of the subbands of the first quantity in the previous data frame acquired by the acquiring unit 10.

Optionally, the acquiring unit 10 is further configured to: before the determining the modification factors of the subbands of the first quantity in the current data frame according to the reference information of the subbands of the first quantity in the previous data frame, acquire signal types of subbands of a third quantity in the subbands in the current data frame, where the third quantity is less than or equal to the first quantity.

The determining unit 15 is further configured to: determine the modification factors of the subbands of the first quantity in the current data frame according to the reference information of the subbands of the first quantity in the previous data frame and the signal types of the subbands of the third quantity that are acquired by the acquiring unit 10.

Optionally, the determining unit 15 is further configured to: determine a second modification factor of a first subband in the subbands of the first quantity in the current data frame according to reference information of a second subband in the subbands of the first quantity in the previous data frame acquired by the acquiring unit 10; determine a first modification factor of the first subband according to a signal type of the first subband acquired by the acquiring unit 10; and use a product of the first modification factor and the second modification factor as a modification factor of the first subband.

Figure 6:
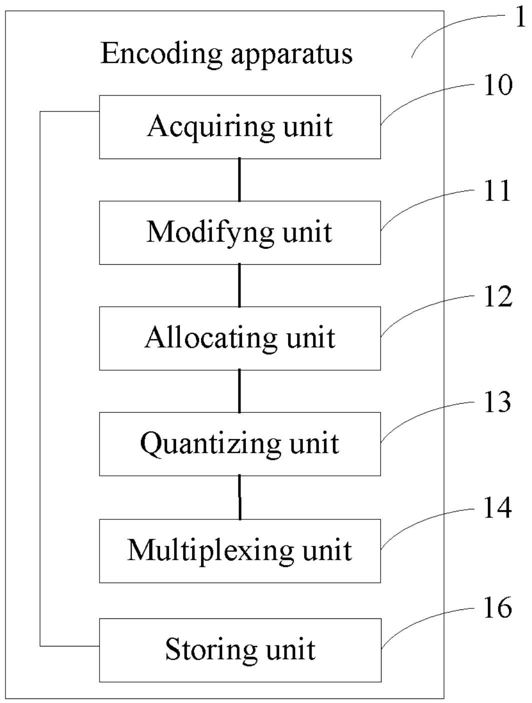
FIG. 6 is a third schematic structural diagram of an encoding apparatus according to an embodiment of the present disclosure.

Optionally, as shown in FIG. 6, the encoding apparatus 1 further includes a storing unit 16.

The storing unit 16 is further configured to store reference information of the subbands of the first quantity after the allocating unit 12 allocates the quantization bits to the subbands according to the modified quantized frequency envelope values of the subbands of the first quantity.

According to the encoding apparatus provided in this embodiment of the present disclosure, after splitting spectral coefficients of a current data frame into subbands, the encoding apparatus acquires quantized frequency envelope values of the subbands; the encoding apparatus modifies quantized frequency envelope values of subbands of a first quantity in the subbands; the encoding apparatus allocates quantization bits to the subbands according to modified quantized frequency envelope values of the subbands of the first quantity; the encoding apparatus quantizes a spectral coefficient of a subband to which a quantization bit is allocated in the subbands; and finally, the encoding apparatus writes the quantized spectral coefficient of the subband to which a quantization bit is allocated into a bitstream. According to this solution, before quantization bit allocation is performed for spectral coefficients of subbands in a current data frame of an audio signal, quantized frequency envelope values of the subbands can be modified according to a signal type of the current data frame and information about a previous data frame; therefore, performing quantization bit allocation for the spectral coefficients of the subbands according to modified quantized frequency envelope values of the subbands and a quantity of available bits can achieve an objective of proper quantization bit allocation for spectral coefficients of an audio signal, thereby improving quality of a signal obtained by a decoder by means of decoding.

Embodiment 4

Figure 7:
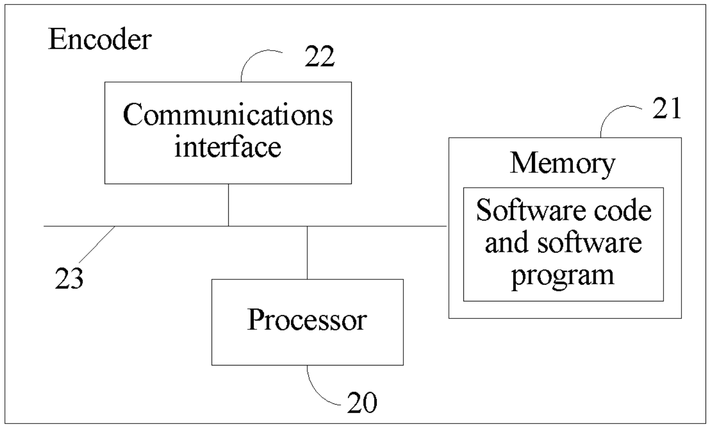
FIG. 7 is a schematic structural diagram of an encoder according to an embodiment of the present disclosure.

As shown in FIG. 7, this embodiment of the present disclosure provides an encoder. The encoder may include a processor 20, a memory 21, a communications interface 22, and a system bus 23.

The processor 20, the memory 21, and the communications interface 22 connects to each other and communicates with each other by using the bus 23.

The processor 20 may be a single-core or multi-core central processing unit, or an application-specific integrated circuit, or one or more integrated circuits configured to implement this embodiment of the present disclosure.

The memory 21 may be a high-speed RAM memory, or may be a non-volatile memory, for example, at least one magnetic disk memory.

The memory 21 is configured to store an instruction executed by the encoder. The instruction executed by the encoder may include software code and a software program.

The processor 20 is configured to: after splitting spectral coefficients of a current data frame acquired from the communications interface 22 by using the system bus 23 into subbands, acquire quantized frequency envelope values of the subbands; modify quantized frequency envelope values of subbands of a first quantity in the subbands; allocate quantization bits to the subbands according to modified quantized frequency envelope values of the subbands of the first quantity; quantize a spectral coefficient of a subband to which a quantization bit is allocated in the subbands; and finally, write, by using the system bus 23, the quantized spectral coefficient of the subband to which a quantization bit is allocated into a bitstream. The memory 21 may be configured to store software code of signal types of the subbands of the first quantity in the current data frame and software code of reference information of subbands of a second quantity in a previous data frame of the current data frame, or software code of signal types of subbands of a third quantity in the current data frame and software code of reference information of subbands of a first quantity in a previous data frame of the current data frame, and a software program for controlling the encoder to complete the foregoing process, so that the processor 20 can complete the foregoing process by executing the software program stored in the memory 21 and by invoking corresponding software code.

Optionally, the processor 20 is further configured to: acquire modification factors of the subbands of the first quantity, and use the modification factors of the subbands of the first quantity to modify the quantized frequency envelope values of the subbands of the first quantity.

Optionally, the processor 20 is further configured to: acquire the signal types of the subbands of the first quantity from the communications interface 22 by using the system bus 23, and determine the modification factors of the subbands of the first quantity according to the signal types of the subbands of the first quantity.

Optionally, the processor 20 is further configured to: when a signal type of a first subband in the subbands of the first quantity is harmonic, determine that a modification factor of the first subband is greater than 1; or when a signal type of a first subband in the subbands of the first quantity is non-harmonic, determine that a modification factor of the first subband is less than or equal to 1.

Optionally, the processor 20 is further configured to: before the determining the modification factors of the subbands of the first quantity according to the signal types of the subbands of the first quantity, acquire the stored reference information of the subbands of the second quantity in the previous data frame of the current data frame, where the second quantity is less than or equal to the first quantity.

Optionally, the processor 20 is further configured to: determine the modification factors of the subbands of the first quantity according to the signal types of the subbands of the first quantity and the reference information of the subbands of the second quantity.

Optionally, the processor 20 is further configured to: determine a first modification factor of the first subband according to the signal type of the first subband in the subbands of the first quantity; determine a second modification factor of the first subband according to reference information of a second subband, corresponding to the first subband, in the subbands of the second quantity; and use a product of the first modification factor and the second modification factor as the modification factor of the first subband.

Optionally, the reference information of the second subband includes a quantization bit allocation status of the second subband and/or a signal type of the second subband, where when the reference information of the second subband includes the quantization bit allocation status of the second subband, the second modification factor is a third modification factor; or when the reference information of the second subband includes the signal type of the second subband, the second modification factor is a fourth modification factor; or when the reference information of the second subband includes the quantization bit allocation status of the second subband and the signal type of the second subband, the second modification factor is a product of the third modification factor and the fourth modification factor.

Optionally, the processor 20 is further configured to: when the quantization bit allocation status of the second subband indicates that no spectral coefficient is encoded, determine that the third modification factor is less than 1, or when the quantization bit allocation status of the second subband indicates that a spectral coefficient is encoded, determine that the third modification factor is greater than 1; and when the signal type of the second subband is harmonic, determine that the fourth modification factor is greater than 1, or when the signal type of the second subband is non-harmonic, determine that the fourth modification factor is less than or equal to 1.

Optionally, the first modification factor of the first subband is determined according to a ratio of any two values of a frequency envelope value of the first subband, an average frequency envelope value of the subbands of the first quantity, a bandwidth value of the subbands of the first quantity, a maximum value of frequency envelope values of the subbands of the first quantity, and a frequency envelope variance value of the subbands of the first quantity; the second modification factor of the first subband is determined according to a ratio of any two values of a frequency envelope value of the second subband, an average frequency envelope value of the subbands of the second quantity, a bandwidth value of the subbands of the second quantity, a maximum value of frequency envelope values of the subbands of the second quantity, and a frequency envelope variance value of the subbands of the second quantity.

Optionally, the processor 20 is further configured to acquire the reference information of the subbands of the first quantity in the previous data frame of the current data frame.

Optionally, the processor 20 is further configured to: determine the modification factors of the subbands of the first quantity in the current data frame according to the reference information of the subbands of the first quantity in the previous data frame.

Optionally, the processor 20 is further configured to: before the determining the modification factors of the subbands of the first quantity in the current data frame according to the reference information of the subbands of the first quantity in the previous data frame, acquire the signal types of the subbands of the third quantity in the subbands in the current data frame, where the third quantity is less than or equal to the first quantity.

Optionally, the processor 20 is further configured to: determine the modification factors of the subbands of the first quantity in the current data frame according to the reference information of the subbands of the first quantity in the previous data frame and the signal types of the subbands of the third quantity.

Optionally, the processor 20 is further configured to: determine a second modification factor of a first subband in the subbands of the first quantity in the current data frame according to reference information of a second subband in the subbands of the first quantity in the previous data frame; determine a first modification factor of the first subband according to a signal type of the first subband; and use a product of the first modification factor and the second modification factor as a modification factor of the first subband.

The processor 20 is further configured to store reference information of the subbands of the first quantity after allocating the quantization bits to the subbands according to the modified quantized frequency envelope values of the subbands of the first quantity.

According to the encoder provided in this embodiment of the present disclosure, after splitting spectral coefficients of a current data frame into subbands, the encoder acquires quantized frequency envelope values of the subbands; the encoder modifies quantized frequency envelope values of subbands of a first quantity in the subbands; the encoder allocates quantization bits to the subbands according to modified quantized frequency envelope values of the subbands of the first quantity; the encoder quantizes a spectral coefficient of a subband to which a quantization bit is allocated in the subbands; and finally, the encoder writes the quantized spectral coefficient of the subband to which a quantization bit is allocated into a bitstream. According to this solution, before quantization bit allocation is performed for spectral coefficients of subbands in a current data frame of an audio signal, quantized frequency envelope values of the subbands can be modified according to a signal type of the current data frame and information about a previous data frame; therefore, performing quantization bit allocation for the spectral coefficients of the subbands according to modified quantized frequency envelope values of the subbands and a quantity of available bits can achieve an objective of proper quantization bit allocation for spectral coefficients of an audio signal, thereby improving quality of a signal obtained by a decoder by means of decoding.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An audio signal encoding method, comprising:

obtaining an initial quantized energy envelope of a subband of a current frame of an audio signal, wherein the subband is one of a plurality of subbands of the current frame;

obtaining a signal type of the subband, wherein the signal type of the subband is either harmonic or non-harmonic;

obtaining a first adjustment factor of the subband based on the signal type of the subband;

obtaining a reference parameter of the subband;

obtaining a second adjustment factor of the subband by updating the first adjustment factor based on the reference parameter;

obtaining an adjusted quantized energy envelope of the subband by adjusting the quantized energy envelope of the subband based on the second adjustment factor; performing bit allocation for the plurality of subbands of the current frame at least based on the adjusted quantized energy envelope of the subband, wherein at least one subbands of the plurality of subbands has at least one allocated bits;

quantizing, based on the at least one allocated bits, at least a part of spectral coefficients included in the at least one subbands; and obtaining a bitstream that includes the quantized spectral coefficients.

2. The audio signal encoding method according to claim 1, wherein the signal type is indicated by a flag.

3. The audio signal encoding method according to claim 1, wherein each of the first adjustment factor and the second adjustment factor is not less than 1 when the signal type is harmonic.

4. The audio signal encoding method according to claim 1, wherein the reference parameter indicates a bit allocation state of a subband of a previous frame adjacent to the current frame.

5. The audio signal encoding method according to claim 4, wherein the reference parameter is a flag.

6. The audio signal encoding method according to claim 4, wherein an index of the subband of the previous frame is the highest among indexes of a plurality of subbands of the previous frame.

7. The audio signal encoding method according to claim 1, wherein an index of the subband of the current frame is the highest among amone-indexes of the plurality of subbands.

8. A device, comprising:

at least one processor; and one or more memories coupled to the at least one processor and storing programming instructions for execution by the at least one processor to cause the device to:

obtain an initial quantized energy envelope of a subband of a current frame of an audio signal, wherein the subband is one of a plurality of subbands of the current frame;

obtain a signal type of the subband, wherein the signal type of the subband is either harmonic or non-harmonic;

obtain a first adjustment factor of the subband based on the signal type of the subband;

obtain a reference parameter of the subband;

obtain a second adjustment factor of the subband by updating the first adjustment factor based on the reference parameter;

obtain an adjusted quantized energy envelope of the subband by adjusting the quantized energy envelope of the subband based on the second adjustment factor;

perform bit allocation for the plurality of subbands of the current frame at least based on the adjusted quantized energy envelope of the subband, wherein at least one subbands of the plurality of subbands has at least one allocated bits;

quantize, based on the at least one allocated bits, at least a part of spectral coefficients included in the at least one subbands; and obtain a bitstream includes the quantized spectral coefficients.

9. The device according to claim 8, wherein the signal type is indicated by a flag.

10. The device according to claim 8, wherein each of the first adjustment factor and the second adjustment factor is not less than 1 when the signal type is harmonic.

11. The device according to claim 8, wherein the reference parameter indicates a bit allocation state of a subband of a previous frame adjacent to the current frame.

12. The device according to claim 11, wherein the reference parameter is a flag.

13. The device according to claim 11, wherein an index of the subband of the previous frame is the highest among indexes of a plurality of subbands of the previous frame.

14. The device according to claim 8, wherein an index of the subband of the current frame is the highest among indexes of the plurality of subbands.

15. A non-transitory computer-readable storage medium storing computer instructions, that when executed by one or more processors, cause the one or more processors to perform the steps of:

obtaining an initial quantized energy envelope of a subband of a current frame of an audio signal, wherein the subband is one of a plurality of subbands of the current frame;

obtaining a signal type of the subband, wherein the signal type of the subband is either harmonic or non-harmonic;

obtaining a first adjustment factor of the subband based on the signal type of the subband;

obtaining a reference parameter of the subband;

obtaining a second adjustment factor of the subband by updating the first adjustment factor based on the reference parameter;

obtaining an adjusted quantized energy envelope of the subband by adjusting the quantized energy envelope of the subband based on the second adjustment factor;

performing bit allocation for the plurality of subbands of the current frame at least based on the adjusted quantized energy envelope of the subband, wherein at least one subbands of the plurality of subbands has at least one allocated bits;

quantizing, based on the at least one allocated bits, at least a part of spectral coefficients included in the at least one subbands; and obtaining a bitstream includes the quantized spectral coefficients.

16. The non-transitory computer-readable storage medium according to claim 15, wherein the signal type is indicated by a flag.

17. The non-transitory computer-readable storage medium according to claim 15, wherein each of the first adjustment factor and the second adjustment factor is not less than 1 when the signal type is harmonic.

18. The non-transitory computer-readable storage medium according to claim 15, wherein the reference parameter indicates a bit allocation state of a subband of a previous frame adjacent to the current frame.

19. The non-transitory computer-readable storage medium according to claim 18, wherein the reference parameter is a flag.

20. The non-transitory computer-readable storage medium according to claim 18, wherein an index of the subband of the previous frame is the highest among indexes of a plurality of subbands of the previous frame.

* * * * *